(12) United States Patent
Perugupalli et al.

(10) Patent No.: US 12,099,184 B1
(45) Date of Patent: Sep. 24, 2024

(54) SYSTEM AND METHODS FOR DETECTING AND CLEANING CONTAMINANTS FROM AN IMAGING OPTICAL PATH

(71) Applicant: Pramana Inc., Cambridge, MA (US)

(72) Inventors: Prasanth Perugupalli, Cary, NC (US);
Ajay Chadha, Karnataka (IN);
Vinothkumar Anbalagan, Tamilnadu (IN); Rohan Prateek, Uttar Pradesh (IN); Shilpa G Krishna, Kerala (IN);
Dipankar Das, Bangalore (IN);
Somesh Singh, Karnataka (IN)

( * ) Notice: Subject to any disclaimer, the term of this patent is extended or adjusted under 35 U.S.C. 154(b) by 0 days.

(21) Appl. No.: 18/382,345

(22) Filed: Oct. 20, 2023

(51) Int. Cl.
| | |
|---|---|
| *G02B 27/00* | (2006.01) |
| *B08B 5/04* | (2006.01) |
| *G01N 21/94* | (2006.01) |
| *G02B 21/36* | (2006.01) |

(52) U.S. Cl.
CPC ........... *G02B 27/0006* (2013.01); *B08B 5/04* (2013.01); *G01N 21/94* (2013.01); *G02B 21/36* (2013.01)

(58) Field of Classification Search
CPC .......... G02B 5/04; G02B 21/00; G02B 21/36; G02B 21/361; G02B 27/0006; G02B 21/368; G01N 21/94; G06T 2207/20081; B08B 5/04
USPC ....................................................... 359/507
See application file for complete search history.

(56) References Cited

U.S. PATENT DOCUMENTS

| | | | | |
|---|---|---|---|---|
| 5,736,745 | A * | 4/1998 | Nagashima | G01Q 30/04 250/222.2 |
| 5,870,186 | A * | 2/1999 | Mogan | G01N 21/94 250/573 |
| 6,005,964 | A * | 12/1999 | Reid | G06T 7/62 378/42 |
| 7,536,061 | B2 | 5/2009 | Steinberg et al. | |
| 8,199,997 | B2 | 6/2012 | Rutenberg et al. | |
| 11,182,899 | B2 | 11/2021 | Raciti et al. | |
| 11,449,973 | B2 | 9/2022 | Rutenberg et al. | |
| 11,978,191 | B1 * | 5/2024 | Gangirevula | G06T 7/0004 |
| 2002/0071115 | A1 * | 6/2002 | Batchelder | G01N 1/02 356/237.1 |
| 2004/0241677 | A1 * | 12/2004 | Lin | G06T 7/0012 435/6.12 |
| 2005/0274898 | A1 * | 12/2005 | Watanabe | G02B 27/0006 250/372 |

(Continued)

*Primary Examiner* — Ricky D Shafer
(74) *Attorney, Agent, or Firm* — Caldwell Intellectual Property Law

(57) ABSTRACT

A system for detecting and cleaning contaminants from an imaging optical path, comprising an imaging device configured to receive a slide and capture a first slide image, at least a computing device configured to determine a contaminant presence indicator associated with a contaminant within an optical path of the imaging device based on the first slide image and execute a contaminant cleaning protocol as a function of the contaminant presence indicator, a contaminant removal mechanism configured to remove the contaminant from the optical path according to the contaminant cleaning protocol, wherein the computing device is further configured to re-evaluate the contaminant presence indicator based on a second slide image of the slide captured using the imaging device and request a user input upon a positive re-evaluation of the contaminant presence indicator.

20 Claims, 11 Drawing Sheets

(56) References Cited

U.S. PATENT DOCUMENTS

| | | | |
|---|---|---|---|
| 2010/0073766 A1* | 3/2010 | Angros | G02B 21/34 |
| | | | 359/397 |
| 2012/0127297 A1 | 5/2012 | Baxi et al. | |
| 2020/0233200 A1* | 7/2020 | Cahoon | G02B 21/241 |
| 2020/0292461 A1* | 9/2020 | Kim | B03C 3/017 |
| 2021/0090238 A1* | 3/2021 | Gallagher-Gruber | |
| | | | G01N 15/0625 |
| 2021/0151287 A1 | 5/2021 | Hyde et al. | |
| 2021/0192730 A1* | 6/2021 | Raciti | G06V 10/776 |
| 2022/0058776 A1 | 2/2022 | Ozcan et al. | |
| 2022/0179187 A1 | 6/2022 | Harfouche et al. | |
| 2022/0318979 A1 | 10/2022 | Chen et al. | |
| 2022/0404602 A1* | 12/2022 | Voegele | G02B 27/0006 |
| 2023/0260125 A1 | 8/2023 | Ianni et al. | |

\* cited by examiner

SYSTEM AND METHODS FOR DETECTING AND CLEANING CONTAMINANTS FROM AN IMAGING OPTICAL PATH

FIELD OF THE INVENTION

The present invention generally relates to the field of real-time image generation. In particular, the present invention is directed to system and methods for detecting and cleaning contaminants from an imaging optical path.

BACKGROUND

Imaging quality of image generated by an imaging device are unacceptable when undesired particles get lodged in certain critical locations inside the imaging device. Imaging process needs to be stopped and the device needs to be cleaned. However, such detection and cleaning process can be difficult when device operators are not available.

SUMMARY OF THE DISCLOSURE

In an aspect, a system for detecting and cleaning contaminants from an imaging optical path is described. The system includes an imaging device configured to receive a slide and capture a first slide image of the received slide. The system also includes at least a computing device communicatively connected to the imaging device, wherein the computing device is configured to determine a contaminant presence indicator associated with a contaminant within an optical path of the imaging device based on the first slide image and execute a contaminant cleaning protocol as a function of the contaminant presence indicator. The system further includes a contaminant removal mechanism operatively connected to the imaging device, wherein the contaminant removal mechanism is configured to remove the contaminant from the optical path according to the contaminant cleaning protocol, wherein the computing device is further configured to re-evaluate the contaminant presence indicator based on a second slide image of the slide captured using the imaging device and request a user input upon a positive re-evaluation of the contaminant presence indicator.

In another aspect, a method for detecting and cleaning contaminants from an imaging optical path is described. The method includes receiving, at an imaging device, a slide, capturing, at the imaging device, a first slide image of the received slide, determining, by a computing device communicatively connected to the imaging device, a contaminant presence indicator associated with a contaminant within an optical path of the imaging device based on the first slide image, executing, by the computing device, a contaminant cleaning protocol as a function of the contaminant presence indicator, removing, using a contaminant removal mechanism operatively connected to the imaging device, the contaminant from the optical path according to the contaminant cleaning protocol, capturing, at the imaging device, a second slide image of the slide, re-evaluating, by the computing device, the contaminant presence indicator based on the second slide image, and requesting, by the computing device, a user input upon a positive re-evaluation of the contaminant presence indicator.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for automated contaminant detection and removal in optical imaging systems. In an embodiment, one or more machine learning algorithms may be employed to identify and differentiate between contaminants and the actual specimen on a slide.

Aspects of the present disclosure can be used to enhance the clarity and accuracy of whole slide images captured by the optical imaging system. Aspects of the present disclosure can also be used to prolong the lifespan of the imaging equipment by preventing damage caused by contaminants. This is so, at least in part, because contaminants can interfere with the optical path, leading to inaccurate imaging and potential damage to sensitive optical components.

Aspects of the present disclosure allow for real-time contaminant detection and prompt removal, ensuring minimal disruption to the imaging process. Exemplary embodiments illustrating aspects of the present disclosure are described below in the context of several specific examples, including a microscope with an integrated contaminant removal mechanism and a camera system with built-in contaminant detection capabilities.

Figure 1:
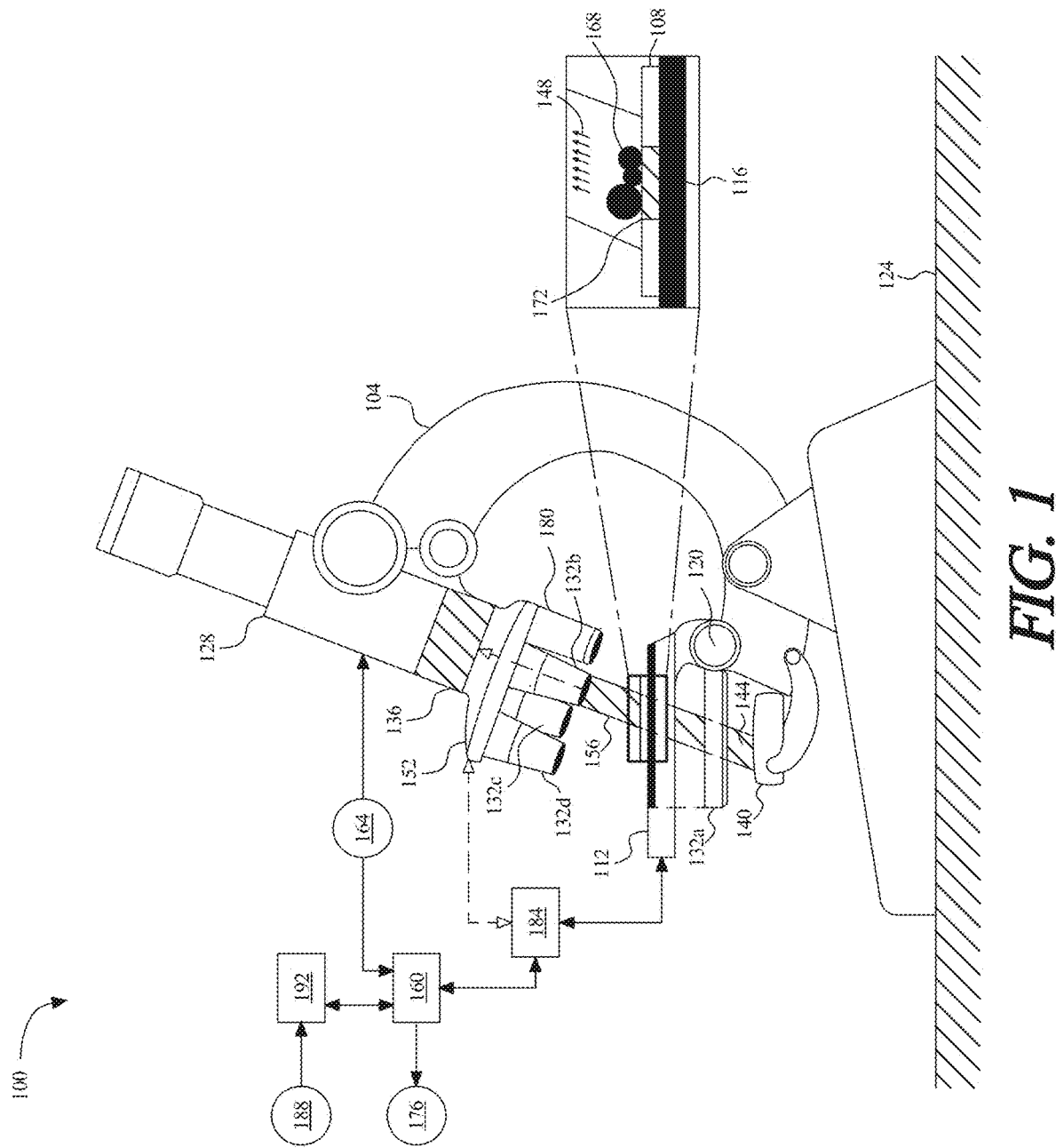
FIG. 1 illustrates an exemplary embodiment of a system for detecting and cleaning contaminants from an imaging optical path.

Referring now to FIG. 1, an exemplary embodiment of a system 100 for detecting and cleaning contaminants from an imaging optical path is illustrated. System may include an imaging device 104. As described in this disclosure, an "imaging device" is an apparatus configured to capture visual information in the form of images or sequences of images. In an embodiment, imaging device 104 may convert an optical image into an electronic signal, which can then be processed, stored, or displayed, as described in detail below. For example, and without limitation, imaging device as described herein, in some cases, may be used specialized for use in medical diagnostics under clinical setting, e.g., a microscope configured to capture detailed, high-resolution images of microscopic subjects to enable accurate diagnosis, disease monitoring, and any other biological researches.

With continued reference to FIG. 1, in a non-limiting example, imaging device 104 may be consistent with any imaging device as described in U.S. patent Ser. No. 18/226, 058, filed on Jul. 25, 2023, and entitled "IMAGING DEVICE AND A METHOD FOR IMAGE GENERATION OF A SPECIMEN," the entirety of which is incorporated herein by reference.

Figure 6:
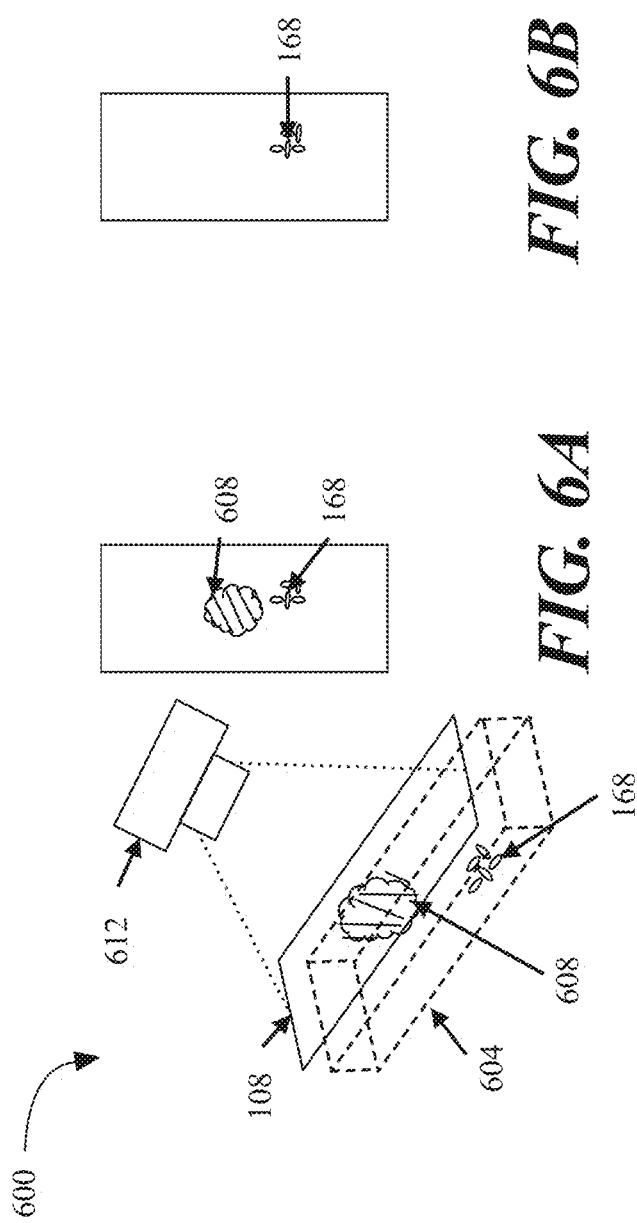
FIG. 6A illustrates a second exemplary embodiment of contaminants removal mechanism with a macro camera with contaminant below it in an imaging area.
FIG. 6B illustrates another second exemplary embodiment of contaminants removal mechanism with a macro camera of an empty slot.
FIG. 6C illustrates another second exemplary embodiment of contaminants removal mechanism of with vacuum suction enabled.
FIG. 6D illustrates another second exemplary embodiment of contaminants removal mechanism after execution of contaminant cleaning protocol.

With continued reference to FIG. 1, imaging device 104 is configured to receive a slide 108. A "slide," for the purpose of this disclosure, is a container or surface for holding a specimen (e.g., specimen as described below with reference to FIG. 6). In some embodiments, slide 108 may include a formalin fixed paraffin embedded slide. In some embodiments, specimen on slide 108 may be stained. In some embodiments, slide 108 may be substantially transparent. In some embodiments, slide 108 may include a glass slide. In some embodiments, slide 108 may include a thin, flat, and substantially transparent glass slide. In some cases, a cover, such as a transparent cover, may be applied to slide 108 such that specimen is disposed between slide 108 and the cover. For example, and without limitation, specimen may be compressed between slide 108 and corresponding cover.

With continued reference to FIG. 1, in an embodiment, imaging device 104 may include at least a stage 112 configured to hold slide 108. As used in this disclosure, a "stage" is a flat platform (i.e., an even surface without significant bumps, depressions, or curvatures) on which slide 108 or specimen is placed for examination. In some cases, stage may include a slide port 116 having one or more alignment features, wherein the "alignment features" are physical features that help to secure slide 108 in place and/or align a slide with another component of imaging device 104 as described herein. In some embodiments, alignment features may include a component which keeps slide 108 secure, such as a clamp, latch, clip, recessed area, or another fastener. In some embodiments, stage 112 may allow for easy removal or insertion of slide 108. In some embodiments, stage 112 may include a transparent surface through which light may travel. In some embodiments, slide 108 may rest on and/or may be illuminated by light traveling through such a transparent surface of stage 112. In some embodiments, stage 112 may be mechanically connected to an actuator mechanism 120 as described below.

Still referring to FIG. 1, in some cases, imaging device 104 may include an actuator mechanism 120. As used herein, an "actuator mechanism" is a mechanical component configured to change the position of a slide relative to an optical system. In a non-limiting example, actuator mechanism 120 may be configured to precisely move stage 112 in the X, Y, and/or even Z directions, allowing for detailed examination of different part of the specimen. In one or more embodiments, actuator mechanism 120 may be used to alter line of sight so that an image of slide 108 may be captured, as discussed further in this disclosure. In some embodiments, actuator mechanism 120 may be mechanically connected to slide 108, such as slide 108 in slide port 116. In some embodiments, actuator mechanism 120 may be mechanically connected to slide port 116. For example, actuator mechanism 120 may move slide port 116 in order to move slide 108. For example, and without limitation, actuator mechanism 120 may move slide port 116 so that a distance D between a top surface of slide 108 and an optical component as described below varies.

With continued reference to FIG. 1, in some embodiments, actuator mechanism 120 may also vary an angle between top surface (e.g., surface directed toward, or facing, optical system and that the slide 108 and/or specimen contacts) and ground 124. In some embodiments, actuator mechanism 120 may be mechanically connected to a mobile element. As used in this disclosure, a "mobile element" refers to any movable or portable object, component, and device within imaging device 104 such as, without limitation, slide 108, slide port 116, stage 112, or an optical system 128 as described in detail below. In some embodiments, a mobile element may move such that at least an optical component of optical system 128 is positioned correctly with respect to slide 108 and contained specimen such that an image of slide 108 may be captured. In some embodiments, actuator mechanism 120 may be configured to change the relative position of slide 108 and optical system 128 by moving stage 112, slide 108, and/or optical system 128 in X, Y, and/or Z directions as described in detail below.

Still referring to FIG. 1, in some embodiments, actuator mechanism 120 may include a hydraulic actuator. A hydraulic actuator may consist of a cylinder or fluid motor that uses hydraulic power to facilitate mechanical operation. Output of hydraulic actuator mechanism 120 may include mechanical motion, such as without limitation linear, rotatory, or oscillatory motion. In some embodiments, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. "Single acting" may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. "Double acting" may be used when pressure is applied substantially on each side of a piston; any difference in resultant force between the two sides of the piston causes the piston to move.

Still referring to FIG. 1, in some embodiments, actuator mechanism 120 may include a pneumatic actuator mechanism. In some cases, a pneumatic actuator may enable considerable forces to be produced from relatively small changes in gas pressure. In some cases, a pneumatic actuator may respond more quickly than other types of actuators such as, for example, hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

Still referring to FIG. 1, in some cases, actuator mechanism 120 may include an electric actuator. Electric actuator mechanism 120 may include any of electromechanical actuators, linear motors, and the like. In some cases, actuator mechanism 120 may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric actuator mechanism 120 may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current.

Still referring to FIG. 1, in some embodiments, an actuator mechanism 120 may include a mechanical actuator mechanism 120. In some cases, a mechanical actuator mechanism 120 may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanisms, including for example without limitation gears, rails, pulleys, cables, linkages, and the like.

Still referring to FIG. 1, in some cases, actuator mechanism 120 may additionally, or alternatively include a transfer mechanism, wherein the "transfer mechanism," as described herein according to some embodiments, refers to a device or system configured to move, shift, or transport mobile element as described above such as, without limitation, slide 108 from one location to another. In a non-limiting example, transfer mechanism may include a programmable robotic arm that is configured to pick up, move, and place slide 108.

One or more alignment features e.g., grippers may be implemented to hold slide 108 during the transportation of slide 108, from a slide basket containing a plurality of slides organized in a pre-determined order to slide port 116 on stage 112 of imaging device 104. Other exemplary embodiments of transfer mechanism as described herein may include, without limitation, conveyor belt system, linear actuator, rotary table (i.e., a rotating platform/stage that hold multiple slides), among others.

With continued to FIG. 1, in some embodiments, imaging device 104 may include an optical system 128. As used in this disclosure, an "optical system" is an arrangement of one or more components which together act upon or employ electromagnetic radiation, such as light (e.g., visible light, infrared light, UV light, or the like). Optical system 128 may include one or more optical components 132a-d, including without limitation lenses, mirrors, windows, filters, and the like. An "optical component," for the purpose of this disclosure, refers to any device or part of a device that manipulates, interacts with, or is affected by light in order to perform a function. Optical system 128 may form an optical image that corresponds to an optical object. For instance, and without limitation, optical system 128 may form an optical image at or upon an optical sensor 136, which can capture, e.g., digitize, the optical image as described in detail below. In some cases, optical system 128 may have at least a magnification. For instance, and without limitation, optical system 128 may include an objective (e.g., microscope objective) and one or more reimaging optical elements that together produce an optical magnification as described in detail below. In some cases, a degree of optical magnification may be referred to herein as zoom.

Still referring to FIG. 1, in some cases, optical system 128 may include a first optical component 132a connected to a light source 140. As used in this disclosure, a "light source" is any device configured to emit electromagnetic radiation. In some embodiments, light source may emit a light 144 having substantially one wavelength. In some embodiments, light source 140 may emit light 144 having a wavelength range. Light 144 emitted by light source 140 as described herein may include, without limitation, ultraviolet light, visible light, and/or infrared light. In non-limiting examples, light source 140 may include a light-emitting diode (LED), an organic LED (OLED) and/or any other light emitter. Such light source may be configured to illuminate slide 108 and/or specimen on slide port 116 and/or stage 112. In a non-limiting example, light source 140 may illuminate slide 108 and/or specimen on slide port 116 and/or stage 112 from below as illustrated in FIG. 1. In another non-limiting example, light source 140 may illuminate slide 108 and/or specimen from above.

With continued reference to FIG. 1, in an embodiment, first optical component 132a may include a condenser lens, wherein the "condenser lens," for the purpose of this disclosure, is an optical component used to focus and condense light 144 emitted by light source 140 as described above onto slide 108 and/or specimen. In some cases, condenser lens may be configured to focus and uniformly distribute light 144 so that slide 108 and/or specimen is evenly illuminated, thereby enhancing the resolution and contrast of the image. In a non-limiting example, first optical component 132a may gather and focus light 144 from light source 140 into a cone of light that illuminate slide 108 and/or specimen with uniform intensity overt the entire viewable area. In some cases, condenser lens may include an aperture diaphragm, e.g., a variable opening that may be adjusted to control the amount of light 144 reading slide 108 and/or specimen. In some cases, adjusting such diaphragm may influence the contrast and depth of field in the image.

With continued reference to FIG. 1, in some cases, optical system 128 may include a second optical component 132b. In some case, second optical component 132b may include an objective lens. As used in this disclosure, an "objective lens" is an optical component that gathers light 148 from slide 108 and/or specimen and focuses it to produce optical image inside imaging device 104. In some embodiments, produced optical image may be magnified by eyepiece lens for viewing by a human operator or captured by optical sensor 136 as described in detail below for digital imaging. In some embodiments, second optical components 132b, (including third optical component 132c, and fourth optical component 132d) may include various magnifications, ranging from 4× to 100× or even beyond. In some cases, magnification may be inscribed on the optical component casing. In some embodiments, optical components 132b-c may include different numerical apertures (NA) that measure lens's ability to gather light and resolve slide 108 and/or specimen detail at a fixed object distance. For example, and without limitation, a higher NA may indicate better resolving power. Exemplary types of objective lens may include, without limitation, dry objectives, immersion objectives, water immersion objectives, and/or the like.

Still referring to FIG. 1, in some embodiments, second optical component 132b, including third optical component 132c, fourth optical component 132d may be mounted on a nosepiece 152. As used in this disclosure, a "nosepiece" is a part of imaging device 104, as shown in FIG. 1, that holds multiple optical components e.g., optical components 132b-d. In some cases, nosepiece may include a revolving nosepiece (also known as a turret), wherein the revolving nosepiece may include a rotatable component located head portion of imaging device 104 and configured to hold multiple objective lens as described above. Optical components 132b-d may be quickly and efficiently switched between different optical components using the revolving nosepiece during examination of slide 108 and/or specimen. In some embodiments, optical system 128 may be parfocal; for instance, and without limitation, when second optical component 132b is in focus, switching to third optical component 132c or fourth optical component 132d may require minimal refocusing. Second to fourth optical components 132b-d may be spaced out at a consistent distance on the revolving nosepiece and each optical component of 132b-d may be at a consistent distance from stage 112.

It should be noted that while optical system 128 as described herein references four optical components, this number is illustrative and should not be restrictive. The actual number of optical components may vary, and optical system 128 may incorporate more or fewer optical components as needed. As an ordinary person skilled in the art, upon reviewing the entirety of this disclosure, will be aware of various modifications, adaptations, and alternative configurations that can be applied to optical system 128 and plurality of optical components 132a-d as described herein.

With continued reference to FIG. 1, an "optical path" 156, for the purpose of this disclosure, refers to a route or trajectory that light 144 and 148 travels through a point of entry to a point where an image is formed), may be defined between first optical component 132a (as the point of entry) and second optical component 132b (as the point where the image is formed). Alternatively, optical path 156 may be defined between first optical component 132a and third optical component 132c or fourth optical component 132d. In some cases, optical path 156 may include a route that light 144 travels from light source 140 to first optical component 132a e.g., condenser lens, light 144 directed by condenser lens to slide 108 and/or specimen on slide port 116 and/or stage 112, light 148 from slide 108 and/or specimen to second optical component 132b, third optical component 132c, or fourth optical component 132d, and from optical components 132b-d to optical sensor 136 or the ocular lens (i.e., eyepiece).

Still referring to FIG. 1, as used herein, an "optical sensor" is a device that measures light and converts the measured light into one or more signals; one or more signals may include, without limitation, one or more electrical signals. In some embodiments, optical sensor 136 may include at least a photodetector. As used herein, a "photodetector" is a device that is sensitive to light and thereby able to detect light. In some embodiments, a photodetector may include a photodiode, a photoresistor, a photosensor, a photovoltaic chip, and the like. In some embodiments, optical sensor may include a plurality of photodetectors. Optical sensor 136 may include, without limitation, a camera. Optical sensor may be in electronic communication with a computing device 160 as described in detail below. As used herein, "electronic communication" as used in this disclosure is a shared data connection between two or more devices. In some embodiments, optical system 128 may include two or more optical sensors. In some cases, optical sensor 136 may be disposed adjacent to plurality of optical components 132b-d. In a non-limiting example, optical sensor 136 may be mounted on nosepiece as described above.

Still referring to FIG. 1, in some embodiments, at least one optical sensor 136 may include a camera. In some cases, a camera may include one or more optics as described herein such as, without limitation, spherical lenses, aspherical lenses, reflectors, polarizers, filters, windows, aperture stops, and the like. In some embodiments, one or more optics associated with a camera may be adjusted in order to, in non-limiting examples, change the zoom, depth of field, and/or focus distance of the camera. In some embodiments, one or more of such settings may be configured to detect a feature of specimen on slide 108. In some embodiments, one or more of such settings may be configured based on a parameter set (i.e., a set of values, such as without limitation, quantitative and/or numerical values that identify how image is to be captured), such as any parameter set as disclosed in U.S. patent application Ser. No. 18/226,058. In some embodiments, camera may capture images at a low depth of field.

With continued reference to FIG. 1, imaging device 104 as described herein may be configured to capture a first slide image of slide 108. In some cases, at least one optical sensor 136 may be utilized for such purposes. As used in this disclosure, a "slide image" refers to a digital representation or photograph of the contents of slide 108 e.g., contained specimen. In an embodiment, when slide is placed on slide port 116 and/or stage 112, a view may be generated by optical system 128 using plurality of optical components 132a-d and captured by optical sensor 136 such as a camera or any other imaging system within imaging device 104. Digital image (i.e., slide image) of such view may represent visual content of slide 108 at a specific magnification and resolution. In some cases, slide image may include a whole slide image (WSI) of slide 108. In other cases, slide image may include only a section of the WSI.

Still referring to FIG. 1, in one or more embodiments, slide image may include image data, wherein the "image data," as used herein, refers to information representing at least a physical scene, space, and/or object. Image data may include, for example, information representing a specimen, slide 108, or even a region of the specimen or slide 108. In some cases, image data may be generated by camera such as any camera as described herein. "Image data" may be used interchangeably through this disclosure with "image," where image is used as a noun. In some cases, digital image may be represented as a bitmap. In other cases, slide image may be comprised of any media capable of representing a physical scene, space, and/or object. Alternatively, where "image" is used as a verb, in this disclosure, it refers to generation and/or formation of an image.

Still referring to FIG. 1, in some embodiments, slide image may include one or more digital files in format such as, without limitation, JPEG, TIFF, PNG, or any other specialized digital formats. In some embodiments, slide image may be captured at a specific magnification level. In some embodiments, slide image may include annotations, such as, without limitation, one or more markers, labels, or notes to highlight specific area of interest or features. In some embodiments, slide image may also include metadata. In some cases, metadata may include, without limitation, information related to the magnification level of one or more optical components, imaging data (e.g., image resolution, image color model, set of parameters, etc.), specimen details (e.g., patient information), and other relevant data.

With continued reference to FIG. 1, in a non-limiting example, at least one optical sensor 136 may capture images such that a first depth of slide 108 and/or specimen is in focus and a second depth of slide 108 and/or specimen is out of focus. In some embodiments, optical system 128 may include an autofocus mechanism configured to determine focus distance. In some embodiments, focus distance may be included in a given parameter set. In some embodiments, camera may be configured to capture a plurality of images at different focus distances. In a non-limiting example, camera may capture a plurality of images at different focus distances, such that images are captured where each focus depth of the slide 108 and/or specimen is in focus in slide image. In some embodiments, at least one optical sensor 136 may include an image sensor. Exemplary non-limiting image sensors include digital image sensors, such as without limitation charge-coupled device (CCD) sensors and complimentary metal-oxide-semiconductor (CMOS) sensors. In some embodiments, optical sensor 136 may be sensitive within a non-visible range of electromagnetic radiation, such as without limitation infrared.

With continued reference to FIG. 1, in some embodiments, optical sensor 136 may include a macro camera specialized to capture images of mall subjects at close distances, producing life-size or larger-than-life magnifications. In some cases, macro camera as described herein may achieve a 1:1 magnification ratio or greater. In some cases, macro camera may include one or more lenses having a short minimum focusing distance e.g., 30 cm. In some embodiments, due to such close focusing distance, the depth of field may be shallow in macro photography, therefore, in some cases, some visual information such as image background may be isolated and discarded. In some cases, an aperture with a high f-number may be used in micro camera to increase the depth of field; however, more light or longer exposure times may be required. Additionally, or alternatively, an image stabilization systems may be implemented, by macro camera to counteract undesired camera movements. Further, micro camera may include additional sensors such as, without limitation, a full-frame sensor, APS-C sensor, micro four-thirds sensor, and/or the like.

Still referring to FIG. 1, an exemplary lens construction of macro camera as described above may be designed to optimize performance at close focusing distances, wherein the macro camera may include a front group optics including a large diameter aspherical lens (to correct spherical aberration) and a low dispersion (LD) lens (to correct chromatic aberration), a middle group optics including a floating lens element (to improve close-up performance) and a standard spherical lens, and a rear group optics including a high refractive index lens (to correct field curvature and enhance sharpness) and an aspherical lens (to further correct for aberrations). In some cases, macro camera may further include an aperture diaphragm located between middle and rear group optics, wherein the aperture diaphragm may be configured to control the amount of light entering macro camera and affecting the depth of field. In some cases, one or more optics as described herein may be coated with a multi-layer anti-reflective coating to reduce lens flare and ghosting.

With continued reference to FIG. 1, in some embodiments, imaging device 104 may be configured to capture slide image of slide 108 as a Z-stack, i.e., a series of slide images captured at different focal planes along the Z-axis (vertical axis) of specimen on slide 108. A z-range, the top and bottom focal planes or interest in specimen, may be identified, and an interval or a step size between each slide image in Z-stack may be determined. In some cases, z-range and step size may be manually entered by a human operator or be provided by parameter set as described above. In other cases, z-range and step size may be determined by computing device 160 as described in detail below. In some cases, smaller step sizes may provide more detailed 3D reconstructions but result in more slide images at the area of interest. Imaging device 104 may be configured to capture a slide image at each focal plane in between z-range and compiled into a single slide image containing a 3D reconstruction of specimen. In a non-limiting example, slide image may be captured by imaging device 104 using specimen image generation method as described in U.S. patent Ser. No. 18/226,058.

With continued reference to FIG. 1, system 100 includes a computing device 160. In one or more embodiments, system 100 and/or computing device 160 may include an application-specific integrated circuit (ASIC) communicatively connected to a memory. Memory may include rea-only memory (ROM) and/or rewritable ROM, FPGA, or other combinational and/or sequential synchronous or non-synchronous digital circuitry to store parameters described further in this disclosure. In one or more embodiments, memory may include one or more memory devices to store data and information, such as parameters or metrics as described herein. The one or more memory devices may include various types of memory including, but not limited to, volatile and non-volatile memory devices, such as, for example, ROM (Read-Only Memory), EEPROM (Electrically-Erasable Read-Only Memory), RAM (Random Access Memory), flash memory, and the like.

Still referring to FIG. 1, in one or more embodiments, computing device 160 may include a processor adapted to execute software stored in memory to perform various methods, processes, and modes of operations in manner as described in this disclosure. In other embodiments, system 100 may include circuitry; for instance, and without limitation, system 100 may include programming in software and/or hardware circuit design. Processor may include or be included in any computing device as described in this disclosure, including without limitation a microcontroller, microprocessor, digital signal processor (DSP) and/or system on a chip (SoC) as described in this disclosure. Computing device 160 may include, be included in, and/or communicate with a mobile device such as a mobile telephone or smartphone. Processor may include a single computing device operating independently, or may include two or more computing device operating in concert, in parallel, sequentially or the like; two or more computing devices may be included together in a single computing device or in two or more computing devices.

Still referring to FIG. 1, computing device 160 may interface or communicate with one or more additional devices as described below in further detail via a network interface device. Network interface device may be utilized for connecting processor to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

With continued reference to FIG. 1, computing device 160 may include but is not limited to, for example, a computing device or cluster of computing devices in a first location and a second computing device or cluster of computing devices in a second location. Computing device 160 may include one or more computing devices dedicated to data storage, security, distribution of traffic for load balancing, and the like. Computing device 160 may distribute one or more computing tasks as described below across a plurality of processors of computing devices, which may operate in parallel, in series, redundantly, or in any other manner used for distribution of tasks or memory between computing devices. Computing device 160 may be implemented using a "shared nothing" architecture in which data is cached at the worker, in an embodiment, this may enable scalability of system 100 and/or computing device 160.

With continued reference to FIG. 1, computing device 160 may be designed and/or configured to perform any method, method step, or sequence of method steps in any embodiment described in this disclosure, in any order and with any degree of repetition. For instance, computing device 160 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 160 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, imaging device, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, computing device 160 is configured to determine a contaminant presence indicator 164 associated with a contaminant 168 within optical path 156 of imaging device 104 based on first slide image as described above. As used in this disclosure, a "contaminant presence indicator" is a metric, signal, or a set of data points derived from analyzing the captured slide image that suggests or confirms the presence of contaminant 168 within optical path 156 of imaging device 104, wherein the "contaminant" refers to any unwanted or foreign substance, particles, or material that potentially interfere with the clarity, quality, or accuracy of the captured image. In some cases, computing device 160 may receive slide image from imaging device 104 through data transfer interfaces including, without limitation, USB, ethernet, Wi-Fi, Bluetooth, and/or the like. Captured slide image may be transmitted from imaging device 104 to computing device through a chosen interface in form of signals or data packets.

Still referring to FIG. 1, as used in this disclosure, a "signal" is any intelligible representation of data, for example from one device to another. A signal may include an optical signal, a hydraulic signal, a pneumatic signal, a mechanical signal, an electric signal, a digital signal, an analog signal, and the like. In one or more embodiments, image data of slide image may be transmitted through one or more signals. In other embodiments, instructions from a human operator of imaging device 104 may send commands to a component of imaging device 104, such as optical system 128 and plurality of optical components 132a-d, through one or more signals. In some cases, a signal may be used to communicate with computing device 160, for example, by way of one or more ports. In some cases, a signal may be transmitted and/or received by computing device 160, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between imaging device 104 and computing device 160. In some cases, a digital signal containing image data of captured slide image may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE [printer port]), and the like.

Still referring to FIG. 1, in some embodiments, computing device 160 may perform one or more signal processing steps on a signal. For instance, computing device 160 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers.

Still referring to FIG. 1, in some embodiments, digital signal processing may be used by computing device 160 to process digitized discrete-time sampled signals. Commonly, digital signal processing may be performed by computing device 160 or other specialized digital circuits, such as without limitation an ASIC, a FPGA, or a DSP. Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, in some cases, contaminant 168 may be of various sizes, from microscopic particles to larger debris. In an embodiment, contaminant 168 may originate from one or more sources, for example, without limitation, contaminant 168 may include dust from the environment, residues from cleaning solutions, oils from human contact, or even specimens such as cells or tissues that inadvertently get onto optical components as described herein. Parts of optical system 128 that one or more contaminants may be adhered to may include lenses and mirrors, light source 140, stage 112, slide port 116, slide 108, optical sensor 136, camera, and/or the like.

Still referring to FIG. 1, in a non-limiting example, contaminant 168 may include dust particles settle on slide 108, slide port 116, first optical component 132a, or even light source 140, wherein the dust particles may come from the surrounding environment. In another non-limiting example, contaminant 168 may include oily residues, such as fingerprints or residues from (human operator) skin contact. Such contact may leave oily marks on one or more component surfaces or optical surfaces in between optical path 156. In yet another non-limiting example, contaminant 168 may include dried specimen residue. In some cases, bits of specimen or mounting medium may spill or splatter onto components e.g., slide port 116 in between optical path 156. In yet another non-limiting example, contaminant 168 may include one or more water spots e.g., residues left behind after cleaning with water or after exposure to moisture. In a further non-limiting example, contaminant 168 may even include airborne microorganisms or fungi that may settle on optical components within optical path 156.

With continued reference to FIG. 1, in some embodiments, computing device 160 may generate contaminant presence indicator 164 by analyzing slide image for anomalies, inconsistencies, or patterns that are not expected to be part of the actual specimen or slide. In some cases, advanced image analysis algorithms, e.g., morphological operations (such as dilation, erosion, opening, or closing), Fourier Transform, scale invariant feature transform (SIFT), image segmentation, edge detection (such as Sobel, Canny, or Prewitt operators), among others may be used to detect and differentiate contaminant 168 from captured slide image. In some cases, one or more machine learning processes, as described in further detail below may be incorporated into the analyzing process of slide image, for example, and without limitation, convolutional neural networks (CNN), support vector machines (SVM), random forests, and/or the like may be implemented, by computing device 160, for contaminant 168 detection and contaminant presence indicator 164 generation as described herein.

Still referring to FIG. 1, in a non-limiting example, contaminant presence indicator 164 may include a binary output e.g., "TURE/POS (i.e., positive)" as "contaminant present" or "FALSE/NEG (i.e., negative)" as "contaminant is not present." In other cases, contaminant presence indicator 164 may include more detailed metric indicating the type, size, density, location, or any other relevant information of detected contaminant 168. Contaminant presence indicator 164 may be generated as a function of one or more data points describing pixel anomalies (i.e., areas in slide image where pixel values deviate significantly from surrounding areas), blurry regions (i.e., parts of slide image that are unexpectedly out of focus due to contaminants on the lens or slide 108), shadow or dark spots, reflective or shiny spots, and/or the like. Additionally, or alternatively, computing device 160 may implement one or more pattern recognition algorithms configured to recognize common contaminant patterns, such as, without limitation, swirls of fingerprints or random scatter of dust particles. Contaminant presence indicator 164 may then be generated, by computing device 160 based on one or more contaminant patterns.

With continued reference to FIG. 1, in an embodiment, contaminant presence indicator 164 may include a datum representing a contamination area 172. A "contamination area," for the purpose of this disclosure, refers to a specific region or zone wherein contaminant 168 e.g., foreign particles, residues, or other unwanted materials are present. In such an embodiment, computing device 160 may be configured to locate contamination area 172 using one or more image processing and analysis algorithms or techniques as described herein. In some cases, irregularities, discolorations, or anomalies of captured slide image may indicate a presence of one or more contaminants, and therefore, may yield a positive output. In a non-limiting example, imaging device 104 may capture a reference slide image when optical path 156 is known to be clean. Contamination area 172 may be located by detecting at least one difference between a subsequent slide image and the reference slide image. Pixel or group of pixels with degraded image quality may indicate contamination area 172. In some cases, contaminant 168 may cause light 144 or 148 to scatter in unpredictable ways. Computing device 160 may be configured to analyze patterns of scattered light and determine contaminant presence indicator 164 and/or contamination area 172. In some cases, for contaminant 168 that may absorb or reflect specific wavelengths of light 144 or 148, spectrum of light passing through slide 108 or reflected off first optical component 132a e.g., condenser lens may be analyzed by computing device 160. Area having an altered light spectrum may be identified as contamination area 172. Additionally, or alternatively, for imaging device 104 having an autofocus system that configured to adjust the focus based on the clarity of the image, if the autofocus system struggles to achieve a clear focus and/or has to make frequent adjustments due to contaminant 168 in optical path 156, computing device 160 communicatively connected to imaging device may be configured to detect and identify areas that causing focus issues as contamination areas 172. Further, other sensors, such as, without limitation, temperature sensor, humidity sensor, electrical sensor, and the like may be incorporated into system 100 to detect physical properties within optical system 128 and/or optical path 156. Changes in detected physical properties may indicate a positive contaminant presence indicator.

With continued reference to FIG. 1, in some cases, computing device 160 may determine contaminant presence indicator 164 using a computer vision model. As used in this disclosure, a "computer vision model" is a (software) component that is configured to perform computer vision tasks as listed above. In some embodiments, computer vision model may be generated using a machine learning module, wherein the machine learning module may be configured to implement one or more machine learning algorithms as described in detail below with reference to FIG. 7. However, the machine learning module is exemplary and may not be necessary to generate one or more machine learning models (e.g., computer vision model) and perform any machine learning (e.g., computer vision tasks) as described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements.

Still referring to FIG. 1, in some cases, exemplary inputs and outputs of training data may come from a data store (e.g., a database) or be provided by a user (e.g., a human operator). In other cases, machine-learning module as described herein may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements.

Still referring to FIG. 1, in some embodiments, determining contaminant presence indicator 164 may include training, using contaminant presence training data, the computer vision model, wherein the contaminant presence training data may include a plurality of slide images as input correlated to a plurality of contaminant presence indicators as output. In some cases, contaminant presence training data may also include a plurality of planarity values (as described in detail below with reference to FIG. 3) as input correlated to a plurality of contaminant presence indicators as output. In other cases, instead of plurality of slide images, contaminant presence training data may further include a plurality of imaging area images (as described in detail below with reference to FIG. 4) as input correlated to a plurality of contaminant presence indicators as output. Contaminant presence indicator 164 may then be determined, using computing device 160, as a function of first slide image using trained computer vision model.

With continued reference to FIG. 1, computing device 160 is then configured to execute a contaminant cleaning protocol 176 as a function of contaminant presence indicator 164. As used in this disclosure, a "contaminant cleaning protocol" refers to a pre-defined set of procedures or actions designed to clean, remove, or mitigate the effects of contaminants 168 from optical path 156 of imaging device 104. In some cases, contaminant cleaning protocol 176 may include one or more instructions related to physical cleaning involving mechanical methods to remove contaminants 168 from optical path 156. In a non-limiting example, contaminant cleaning protocol 176 may include one or more instructions related to air blasting method that uses compressed air to blow away loose particles. In another non-limiting example, vibration method such as shaking or vibrating system components that are in contact with contaminants 168 may be also incorporated within contaminant cleaning protocol 176. In a further non-limiting example, contaminant cleaning protocol 176 may further include instructions describing a suction cleaning method that utilize a suction force to draw way contaminants from a surface e.g., cover of slide 108, top surface of slide port 116, stage 112, first optical component 132*a*, light source 140, or the like.

Still referring to FIG. 1, additionally, or alternatively, aspects related to chemical cleaning methods that use solvents or cleaning agents to dissolve or remove contaminants 168 may be included within contaminant cleaning protocol 176. In some cases, executing contaminant cleaning protocol may include applying specialized solutions, such as, without limitation, lens cleaning solutions, alcohol, among others. Other exemplary cleaning methods may be performed during execution of contaminant cleaning protocol 176 may include, without limitation, electrostatic cleaning method that use electrostatic forces to attract and remove charged particles, ultrasonic cleaning method that use ultrasonic waves in cleaning solution to dislodge contaminants from intricate parts, thermal cleaning methods that utilize heat to break down or evaporate contaminants 168, and the like.

Still referring to FIG. 1, in some cases, executing contaminant cleaning protocol 176 may include selecting at least one cleaning method from plurality of cleaning methods as described herein based on contaminant presence indicator and associated information such as, without limitation, contaminant type, contaminant location, contaminant presence time, and/or the like. Different contaminants may require different cleaning methods. As a person skilled in the art, upon reviewing the entirety of this disclosure, will be aware of various methods and techniques suitable for specific contaminant as described herein that may be employed, by system 100 to generate, adapt, or modify contaminant cleaning protocol 176 to achieve optimal cleaning result.

With continued reference to FIG. 1, system 100 further includes a contaminant removal mechanism 180 operatively connected to imaging device 104. As used in this disclosure, a "contaminant removal mechanism" refers to a device or set of devices designed to eliminate or reduce contaminants 168 detected in optical path 156 of imaging device 104. "Operatively connected," for the purpose of this disclosure, means that two or more components are linked or joined in such a way that they can function together to achieve a desired outcome. In a non-limiting example, contaminant removal mechanism 180 may be configured to work in tandem with imaging device 104 and may be controlled or activated based on inputs or signal from computing device 160 in communicative connection with imaging device 104. In an embodiment, contaminant removal mechanism 180 may remove contaminant 168 from optical path 156 upon activation, wherein computing device 160, in some cases, may active contaminant removal mechanism 180 based on contaminant presence indicator 164, and detected contaminant 168 may be removed by contaminant removal mechanism 180 according to contaminant cleaning protocol 176 as described above.

Still referring to FIG. 1, in some cases, contaminant removal mechanism 180 may include one or more physical cleaning tools such as, without limitation, brushes or wipers having soft bristles or materials that gently sweep surfaces of components disposed in between optical path 156 e.g., stage 112, slide port 116, optical components 132*a-d*, light source 140, and of the like. In some cases, physical cleaning tools may be mechanically attached to actuator mechanism 120 as described above, allowing for automated and precise movement and/or positioning of physical cleaning tools to target specific areas such as contamination area 172 indicated by contaminant presence indicator 164. Actuator mechanism 120 may control pressure, angle, and motion of one or more physical cleaning tools according to contaminant cleaning protocol 176. In a non-limiting example, a brush attached to actuator mechanism 120 may be configured, by computing device 160, to sweep across the top surface of stage 112 or cover of slide 108 securely positioned on stage 112 in a specific pattern, thereby removing contaminant 168 such as dust and undesired debris that may interfere with the slide imaging process as described herein.

Still referring to FIG. 1, in one or more embodiments, contaminant removal mechanism 180 may include at least one vacuum suction enabled component. As used in this disclosure, a "vacuum suction enabled component" refers to a component that generates a vacuum or suction force. In some cases, at least one vacuum suction enabled component may utilize generated vacuum or suction force to draw away contaminants from contamination area 172 as described above. In some cases, such contaminant removal mechanism 180 may be particularly effective for removing contaminant 168 such as loose particles, debris, and any other contaminants that can be easily lifted off a surface. In a non-limiting example, at least one vacuum suction enabled component may include a suction device. In some cases, suction device may include a vacuum pump or even a simple handheld suction tool that is mechanically fixed to imaging device 104 and actuated by actuator mechanism 120.

With continued reference to FIG. 1, in some cases, at least one vacuum suction enabled component may include at least an inlet. In some cases, contaminant removal mechanism 180 may incorporate one or more filters configured to trap and collect contaminants 168 being removed. In some cases, computing device of contaminant removal mechanism 180 may control and adjust suction force and/or duration based on type and amount of contamination, for instance, a lighter suction may be used for fine dust particles, while a stronger suction may be needed for larger debris.

In some cases, contaminant removal mechanism 180 may also include an integrated suction system that may automatically activate when contaminants are detected (i.e., a positive contaminant presence indicator received). Contaminant cleaning protocol containing a suction cleaning process within optical system 128 within imaging device 104 may be executed by computing device 160. Additionally, or alternatively, a combination of suction with air blasts may be implemented by contaminant removal mechanism 180. While air blast dislodge contaminant 168 at contamination area 172, suction generated by vacuum suction enabled component may immediately draw contaminant 168 away, preventing it from resettling on optical path 156.

Still referring to FIG. 1, in other cases, contaminant removal mechanism may further include a removal adapter attached to at least an inlet of at least one vacuum suction enabled component, wherein the "removal adapter," as described herein, refers to a specialized attachment designed to enhance the efficiency and precision of the vacuum suction process by adapting to various surfaces and contamination types. Removal adapter may be configured to extend a reach of vacuum pump within contaminant removal mechanism. In a non-limiting example, removal adapter may include a nozzle or tip removably attached to inlet of at least one vacuum suction enabled component, wherein the nozzle or tip may be brought close to or in contact with contaminated surface including contamination area 172.

With continued reference to FIG. 1, in some embodiments, contaminant cleaning protocol 176 may be generated, determined, and executed without user intervention; for instance, and without limitation, contaminant removal mechanism 180 may include one or more built-in air blaster or vacuum pump configured to immediately remove dust upon a positive detection of dust, by additional sensors within imaging device 104, on one or more optical components such as objective lens. In some embodiments, in environments prone to regular contamination, computing device 160 may be configured to execute contaminant cleaning protocol using contaminant removal mechanism 180 at pre-determined time intervals, regardless of the value of contaminant presence indicator 164. In other embodiments, contaminant removal mechanism 180 may employ adaptive cleaning, wherein computing device 160 may leans from past determined contaminant presence indicator and/or past executed contaminant cleaning protocols and adapts current contaminant cleaning protocols that is going to execute accordingly. In a non-limiting example, if computing device 160 frequently detects oil contaminants at specific times, contaminant removal mechanism 180 may be scheduled for more frequent cleanings during those time periods.

With continued reference to FIG. 1, additionally, or alternatively, computing device 160 may communicate with other computing devices e.g., a stage controller 184 configured to move stage 112 to a desired location determined based on contaminant cleaning protocol using actuator mechanism 120, thereby enabling contaminant removal mechanism to remove contaminant 168 from optical path 156. As used in this disclosure, a "stage controller" refers to a computing device designed to precisely control movement and positioning of stage 112 in multiple dimensions. In some cases, stage controller may be communicatively connected with computing device 160, receiving and interprets contaminant cleaning protocol 176 from computing device 160 and translate them into mechanical movements using actuator mechanism 120 as described herein. In a non-limiting example, stage controller may include a XYZ controller that can move stage 112 horizontally (X-axis), vertically (Y-axis), and depth (Z-axis). In some cases, one or more motors and actuators within actuator mechanism 120 may be used to navigate stage 112 and/or contaminant removal mechanism 180, to pre-configured locations on first optical component 132*a* e.g., condenser lens and stage 112. In some cases, one or more datums related to position of stage 112 in one or more dimensions may be signaled (using encoders) to computing device 160 in real-time.

Still referring to FIG. 1, in some embodiments, desired location e.g., (x, y, z) of stage 112 may be determined based on the location of contamination area 172 indicated by contaminant presence indicator 164. In a non-limiting example, if contaminant presence indicator 164 identifies a specific region of slide 108 as being contaminated, stage controller 184 may move stage 112 such that this region is positioned directly beneath contaminant removal mechanism e.g., at least one inlet of vacuum suction enabled component as described above. Additionally, or alternatively, computing device 160 may be configured to store predefined positions or sequences in a database, allowing for automated routines where stage 112 moves through a series of positions to facilitate cleaning process e.g., a scheduled comprehensive cleaning in scenarios where contaminant 168 may be dispersed across multiple areas on slide 108 or optical components 132*a-d*.

With continued reference to FIG. 1, computing device 160 is further configured to re-evaluate contaminant presence indicator 164 based on a second slide image of slide 108. In some embodiments, imaging device 104 may be used to image the second slide image in a manner similar to capturing the first slide image as described above. In some cases, such re-evaluation process may ensure that contaminant cleaning protocol has been effectively executed based on contaminant presence indicator 164 determined as a function of first slide image and that slide 108, stage 112, slide port 116, optical components 132*a-d*, and/or light source 140 may be free from contaminant 168, ensuring the accuracy and clarity of subsequent imaging process e.g., generation of second slide image or first slide image of a second slide. In some cases, re-evaluating contaminant presence indicator 164 may include utilizing same optical components, light sources, set of parameters as described above. In some cases, second slide image may serve as a post-cleaning verification to confirm the removal of contaminants (i.e., a negative contaminant presence indicator).

Still referring to FIG. 1, in some cases, second slide image may be captured at different magnification or focal length to provide a more detailed view of area of interest or specific areas previously identified as contamination area 172. Computing device 160 may employ one or more image comparison algorithms to automatically compare first slide image and second slide images. In some cases, any discrepancies or remaining contaminants may be highlighted or flagged for further actions. In a non-limiting example, if contaminant 168 is still detected i.e., a repeated receipt of positive contaminant presence indicator, system 100 may trigger additional cleaning cycles (e.g., another iteration of contaminant cleaning protocol execution and contaminant presence indicator evaluation) or alter a human operator for manual intervention as described below.

With continued reference to FIG. 1, in one or more embodiments, imaging device 104 may utilize different imaging modalities for second slide image, for example, and without limitation, using fluorescence imaging or phase contrast imaging to capture second slide image. In such an embodiment, second slide image may have an enhanced visibility of specific contaminant 168 that may be less apparent under standard brightfield imaging, allowing a more accurate re-evaluation of contaminant presence indicator 164. Additionally, or alternatively, computing device 160 may implement a feedback look mechanism. For instance, and without limitation, if second slide image yield a positive output of the presence of contaminant 168, feedback loop may be configured to adjust parameters and/or instructions within contaminant cleaning protocol 176 as a function of the re-evaluation of contaminant presence indicator 164. In some cases, contaminant cleaning protocol 176 may be switched from a first cleaning method (e.g., physical cleaning method) to a second cleaning method (e.g., chemical cleaning method), or switch between modes, for example, and without limitation, between default cleaning mode to a more aggressive cleaning mode or a cleaning mode that targeting specific areas.

Still referring to FIG. 1, in a non-limiting example, if first slide image showed one or more contaminants primarily in the center of slide 108 (i.e., contamination area 172), second slide image may employ a higher magnification focused on this central region to ensure thorough cleaning. In some cases, if the contaminants are still observed (indicated by a positive contaminant presence indicator), computing device 160 within system 100 may be configured to initiate and execute a targeted cleaning protocol, wherein the targeted cleaning protocol include employment of localized suction using at least one vacuum suction enabled component attached with a removal adapter and/or release cleaning agent within contaminant removal mechanism 180 for such contamination area. Removal adapter, in this case, may be shaped or designed with a narrow or tapered end, allowing for precise suction targeting. In some cases, suction force produced by vacuum suction enabled component may be concentrated on contamination area 172 using removal adapter as described herein.

With continued reference to FIG. 1, in some cases, re-evaluating contaminant presence indicator 164 may include refining computer vision model configured for determining presence of contaminant 168 on slide images as described above, by incorporating re-evaluated contaminant presence indicators into training data such as contaminant presence training data, to continually improve accuracy and reliability of computer vision model and/or any other machine learning process as described herein in real-time. In some cases, when computing device 160 re-evaluates contaminant presence indicator 164 based on second slide image, post-cleaning verification of condition of slide 108 may be provided as "ground truth" data which confirms the presence or absence of contaminants after the execution of contaminant cleaning protocol 176. Computing device 160 may be configured to compare initial prediction i.e., contaminant presence indicator 164 determined based on first slide image with the re-evaluated contaminant presence indicator determined based on second slide image and identify discrepancies based on the comparison, wherein the identified discrepancies may be used to flag instances where computer vision model have made false positive or false negative predictions during initial assessment of contaminant presence indicator 164 (prior to execution of contaminant cleaning protocol 176).

Still referring to FIG. 1, in some cases, updated contaminant presence training data may be used to fine-tune one or more hyperparameters of computer vision model and/or any other machine learning models as described herein. In a non-limiting example, if computer vision model consistently misidentifies a particular type of contaminant, additional labeled examples associated with that type of contaminant may be added to contaminant presence training data to improve model's recognition capabilities. In some embodiments, as imaging device 104 encounters a diverse range of slides, contaminants, and/or environmental conditions, computer vision model may be exposed to a wide variety of scenarios, and by training on expanded dataset, computer vision model as described herein may become more resilient to variations and anomalies, ensuring consistent performance even in unforeseen situations where a new type of contaminant 168 is introduced in optical path 156.

With continued reference to FIG. 1, computing device 160 is further configured to request a user input 188 upon a positive re-evaluation of the contaminant presence indicator 164. As used in this disclosure, "user input" refers to any form of direct or indirect interaction, feedback, or intervention provided by a human operator to system 100 as described herein. In some embodiments, user input 188 may be in the form of commands, selections, feedback, or any other type of information that influences determination of contaminant presence indicator 164 and/or execution of contaminant cleaning protocol 176 of system 100 as described above. In some embodiment, user input 188 may include any interaction between one or more human operators with system components such as, without limitation, imaging device 104, computing device 160, actuator mechanism 120, contaminant removal mechanism 180 and/or the like. In a non-limiting example, user input 188 may include manual adjustments to focus or positioning of imaging device 104 and optical components 132a-d within optical system 128 thereof, calibration or configuration changes (e.g., sensitivity thresholds for contaminant detection or parameters of computer vision model) to computing device 160 entered using input devices, manually setting or fine-tuning movement patterns, speed, or range of motion of actuating mechanism 120, among others.

Still referring to FIG. 1, in some embodiments, computing device 160 may request user input 188 in scenarios where automated methods as described herein may not be sufficient or where human judgment is deemed necessary (determined based on positive re-evaluation of contaminant presence indicator 164). In some cases, user input 188 as described herein may include a manual cleaning of system 100 and device thereof e.g., imaging device 104. In a non-limiting example, in a situations where contaminant presence indicator 164 determined by computing device 160 suggests a level of contamination that, while detectable by the system, may be better addressed through manual cleaning (i.e., user input 188). In some cases, determining and/or re-evaluating contaminant presence indicator based on slide images may further include evaluating the nature of the contaminant, contamination area 172, or other environmental factors that may against contamination cleaning protocol (e.g., make automated cleaning less effective or potentially harmful to slide 108 or other system components). In this case, execution of contaminant cleaning protocol may be skipped by computing device 160 and request for user input 188 directly.

With continued reference to FIG. 1, in one or more embodiments, "request" (for user input 188) may be manifested in various ways, for example, and without limitation, computing device 160 may displaying an alert to a user e.g., human operator through a user interface at a display device 192 communicatively connected to computing device 160, requesting the user to clean contaminant 168 through human machine interfaces. As used in this disclosure, a "display device" is a device that is used to display content. A "user interface," as used herein, is a means by which a user and a computer system interact; for example, through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface, wherein the "graphical user interface (GUI)," as used herein, is a graphical form of user interface that allows users to interact with electronic devices. User interface may include output interface and input interface. In some embodiments, output interface may include one or more elements through which imaging device 104, computing device 160, and/or contaminant removal mechanism 180 may communicate information to a human operator. In a non-limiting example, output interface may include a display e.g., a high-resolution display. In some cases, display may output images, videos, and the like to a user. In a non-limiting example, display device 192 may display a notification on user interface, indicating the need for manual cleaning, wherein the notification may provide details about the contaminant 168 such as the type and location of contaminate 168, along with recommendations or guidelines for manual cleaning. Additionally, or alternatively, computing device 160 may integrate with other output systems or devices, such as speakers (e.g., alarms), light sources (e.g., visual indicators), or even haptic feedback mechanisms, to draw user's attention.

Still referring to FIG. 1, in a non-limiting example, contaminant presence indicator 164 may indicate a detected contaminant having a type of residue that contaminant removal mechanism 180 struggle to remove completely. Upon detection, computing device 160 may prompt a human operator with a message such as, without limitation, "Manual cleaning recommended for optimal results. Please refer to the highlighted area," and then display first slide image (if execution of contaminant cleaning protocol is skipped), or second slide image (if contaminant cleaning protocol is executed), or even both (in a side to side view for easy comparison). Human operator may then intervene, using specialized tools or techniques to address the contamination. Once manual cleaning is completed, system 100 may re-evaluate slide 108, ensuring that the contaminant 168 has been effectively removed from optical path 156.

Figure 2:
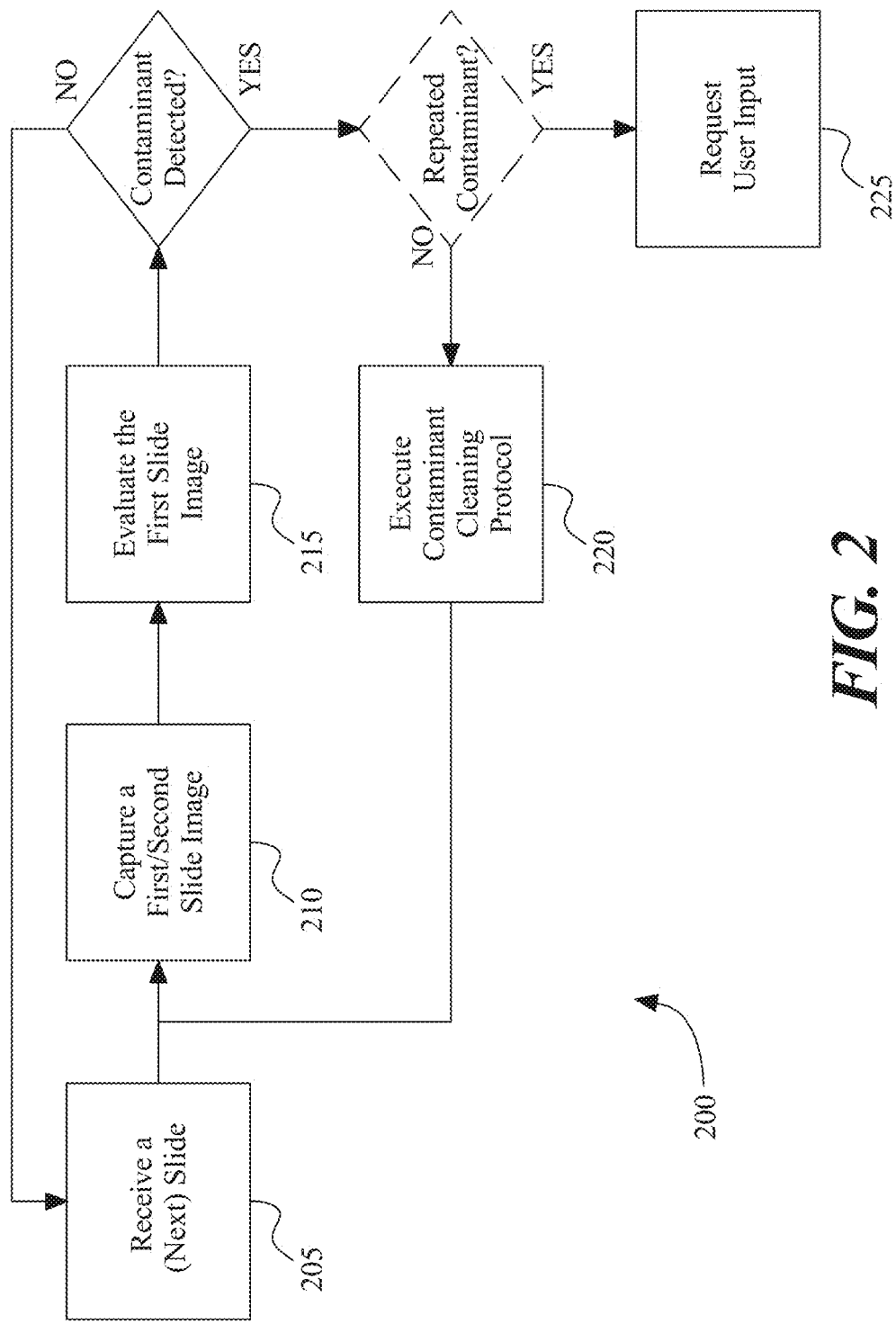
FIG. 2 is a flow chart showing a first exemplary embodiment of detection and subsequent actions that are triggered to clean contaminants.

Now referring to FIG. 2, a flow chart 200 of a first exemplary embodiment of detection and subsequent actions that are triggered to clean contaminants is illustrated. At step 205, imaging device may receive a slide. A first slide image may be captured at step 210. Computing device may be configured to determine a contaminant presence indicator, for example a metric to detect and establish presence of one or more undesired particles on WSI of received slide, using one or more pattern detection techniques at step 215. In some cases, pattern detection techniques may include, without limitation, edge detections, color analysis, feature extractions, image classifications, and/or the like. In some cases, most of the slides typically get scanned with no contaminants detected. In these cases, next slide in the sequence may be selected for scanning (at step 205). At step 220, computing device may execute contaminant cleaning protocol, in case of a positive contaminant presence indicator is returned, using contaminant removal mechanism.

Still referring to FIG. 2, in some cases, contaminant removal mechanism may include an electro-mechanical system along with a vacuum pump as described above with reference to FIG. 1. In a non-limiting example, computing device may strongly correlate first slide image to presence of contaminant in optical path and needs to be cleared based on positive contaminant presence indicator. In this scenario, contaminant presence indicator may include an indicator associated with the contaminant located on first optical component e.g., condenser lens within the optical path. When contaminant is detected for a particular slide at first time, contaminant removal mechanism that uses a vacuum suction enabled component e.g., vacuum pump to clear the detected contaminants may be triggered. Slide may be scanned again, and contaminant may be checked again (at step 215). In case where contaminant is detected again for the same slide, imaging device 104 may pause operations and request, by computing device using display device having user interface for user input e.g., manual cleaning of containment by human operator.

Figure 3:
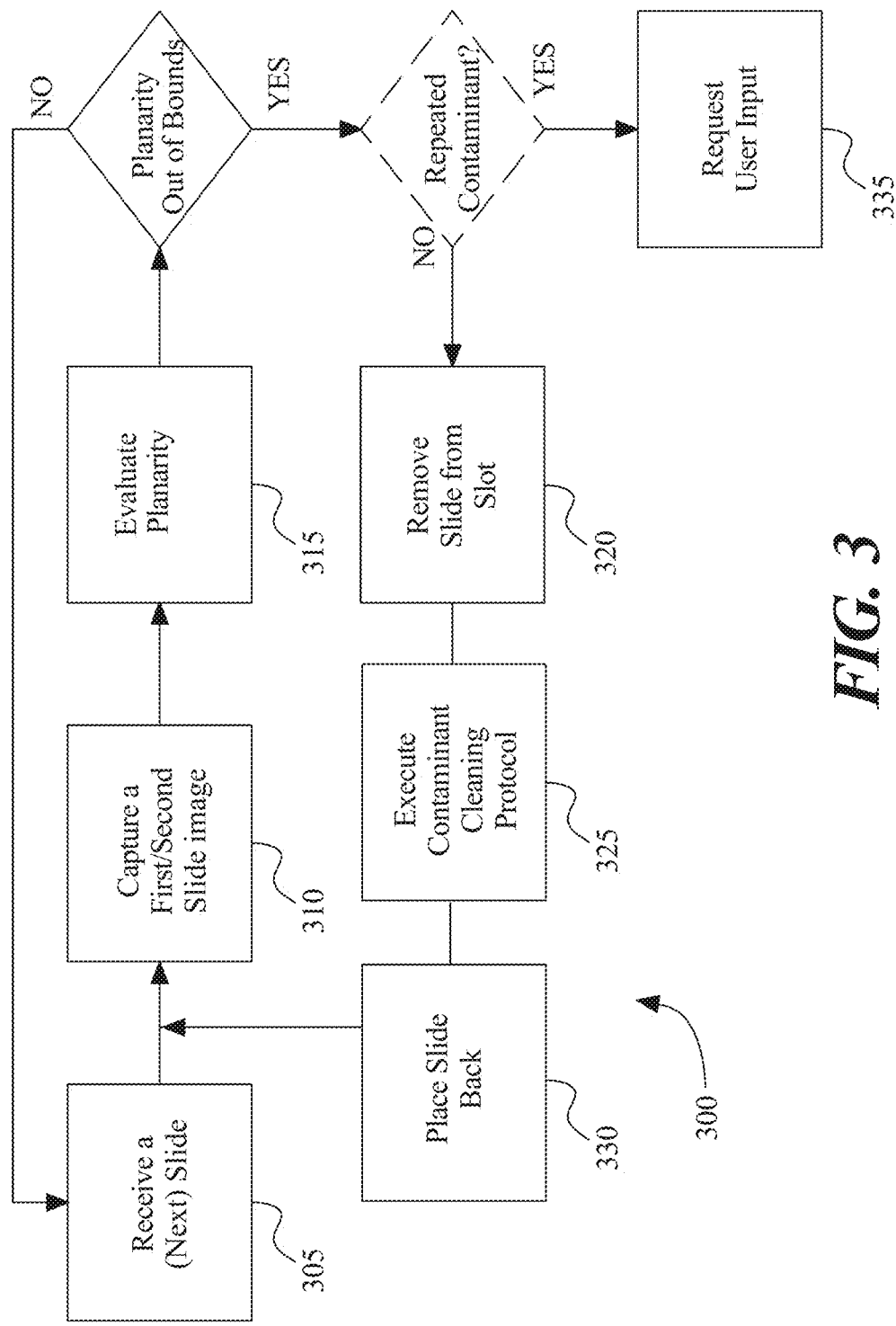
FIG. 3 is a flow chart showing a second exemplary embodiment of detection and subsequent actions that are triggered to clean contaminants.

Now referring to FIG. 3, a flow chart 300 of a second exemplary embodiment of detection and subsequent actions that are triggered to clean contaminants is illustrated. At step 305, imaging device may receive a slide. A first slide image may be captured at step 310. Computing device may be configured to calculate a planarity score based on captured first slide image. As used in this disclosure, a "planarity score" is a value or metric that quantifies the flatness or evenness of a surface, such as, without limitation, slide's surface, slide cover surface, stage surface, slide port surface, and/or the like based on captured slide image. In some embodiments, computing device may implement 3D plane fitting techniques to calculate planarity score. In some cases, 3D plane fitting techniques may involve analyzing pixel values of captured slide image and fitting them to a 3D plane model. Deviations from 3D plane model e.g., peaks or valleys, may indicate non-planar regions or contamination area. In some cases, magnitude and distribution of deviations may be used to compute planarity score.

Still referring to FIG. 3, in some embodiments, at step 315, contaminant presence indicator may be determined as a function of calculated planarity score, for example, and without limitation, a lower planarity score may indicate a significant deviation from a pre-determined flatness (i.e., ideal flatness wherein the examined surface is parallel to the ground), may suggest a presence of contaminant or other obstructions, and thus may yield a positive contaminant presence indicator. Conversely, a high planarity score, close to a maximum possible value (e.g., 1.0, 10 or 100) or a percentage (e.g., 100%) may suggest a clean and flat slide surface. In a non-limiting example, if planarity score falls below a predefined threshold, computing device may trigger contaminant cleaning protocol aiming to restore slide's planarity. In case wherein planarity score is above the threshold, computing device may determine that slide may be sufficiently clean and proceed with imaging of the cleared slide and/or next slide.

Still referring to FIG. 3, additionally, or alternatively, planarity score may be calculated based on multiple slide images or Z-stacks as described above. Computing device may be configured to perform a focus analysis, for instance, and without limitation, for each slide image of Z stack, one or more image processing algorithms as described herein may be used to determine a clarity or sharpness (e.g., variance of the Laplacian, Brenner's gradient, and Tenenbaum's gradient, among others) of one or more selected features. In a non-limiting example, sharpest slide image (highest focus metric value) may correspond to the plane of focus. Computing device may then compare planes of focus for different sections across the slide. If slide is perfectly planar, the plane of focus should be consistent across the slide. In some cases, any variation in the focus depth across different regions may indicate a deviation from perfect planarity. In an embodiment, planarity score may be computed, by computing device, as a function of difference between a highest and a lowest planes of focus, for example, and without limitation, a smaller difference may suggest a more planar slide, while a larger difference may indicate less planarity. Further, calculating planarity scores may include generating a surface topography or a 3D representation of the slide's surface based on the different focus depths.

With continued reference to FIG. 3, in some cases, most of the slides typically captured with planarity values within acceptable bounds i.e., below threshold. In these cases, at step 305, next slide in the sequence may be selected for imaging. However, when planarity score of a slide is detected to be out of bounds i.e., above threshold, computing device may strongly correlate the slide to a contaminant presence indicator describing detected contaminant located on a slide setting area of stage, for example, and without limitation, an indicator indicating a presence of contaminant between glass slide and the top plate of stage and needs to be cleared. First time around when such planarity issue is detected for a particular slide, slide may be removed by actuating mechanism at step 320. Contaminant removal mechanism may be triggered that uses a vacuum system as described above to clear the contaminant (i.e., contaminant cleaning protocol) at step 325 and slide may be placed back to stage or slide port after the execution of the contaminant cleaning protocol at step 330. The slide may then be re-imaged at step 310 and planarity value may be checked again at step 315. In case planarity is within the threshold, next slide in sequence may be transferred to imaging device for capturing slide images of next slide. On the other hand, when said planarity issue is detected again for the same slide, imaging device may be paused, and a user input may be requested by computing device at step 335.

Figure 4:
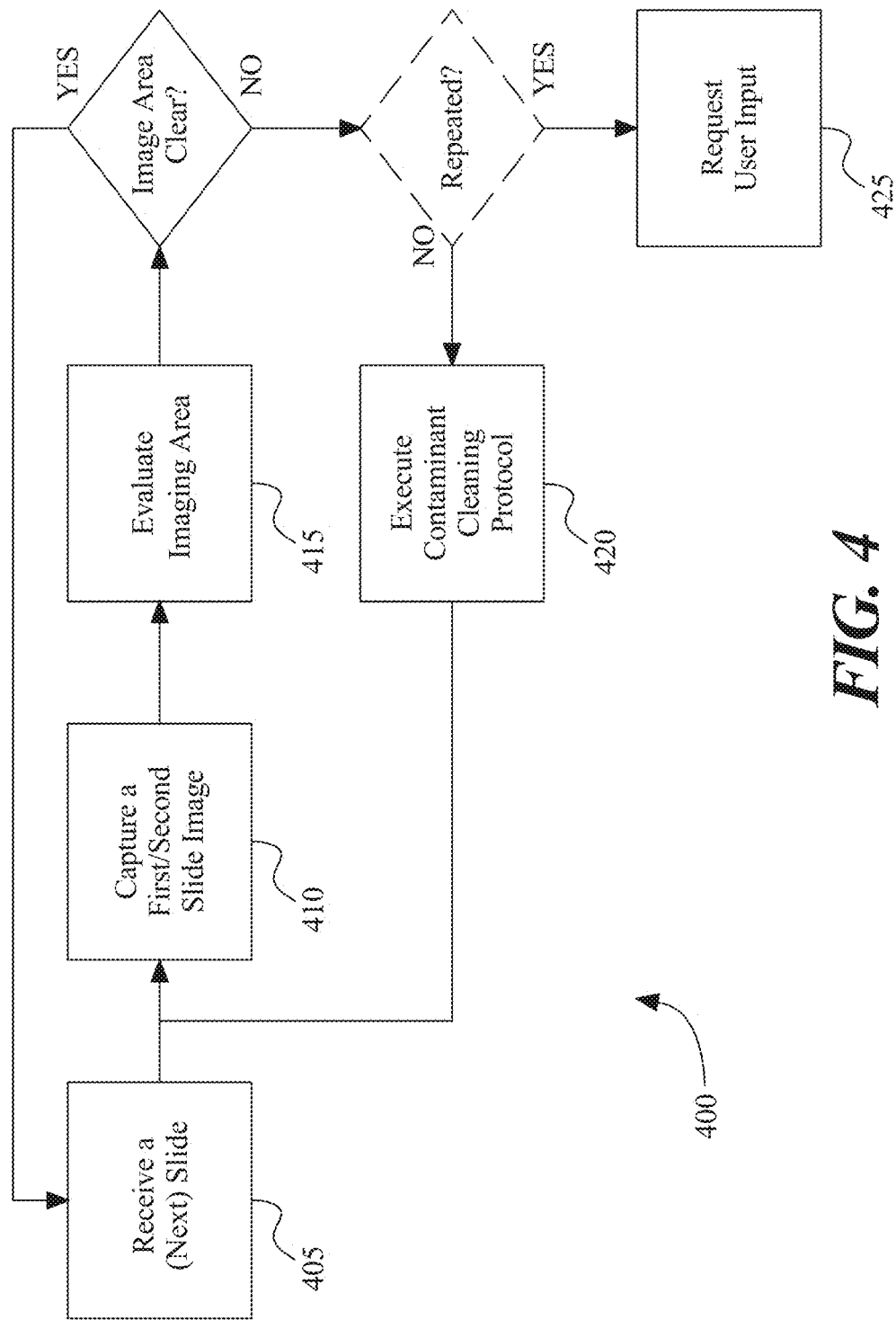
FIG. 4 is a flow chart showing a third exemplary embodiment of detection and subsequent actions that are triggered to clean contaminants.

Now referring to FIG. 4, a flow chart 400 of a third exemplary embodiment of detection and subsequent actions that are triggered to clean contaminants is illustrated. At step 405, imaging device may receive a slide. A first slide image may be captured and removed at step 410. In some cases, slide may be removed, by actuator mechanism and/or transfer mechanism as described above from slide port or stage of imaging device. After slide has been imaged and removed from, at step 415, at least one optical sensor, such as, without limitation, macro camera may be used to capture a macro image of the imaging area, wherein the macro image may then be analyzed by computing device using computer vision model as described above. In some cases, imaging area may include an area of slide port and/or stage delineated by a projection of camera's field of view (FOV). In some cases, imaging area may include top surface of first optical component e.g., condenser lens and/or light source. Computing device may then be configured to determine contaminant presence indicator based on one or more macro images of the imaging area.

Still referring to FIG. 4, in some embodiments, contaminant presence indicator may be associated with contaminant located below slide placed at imaging area on stage. In a non-limiting example, contaminants may be specifically detected in imaging area in stage e.g., below glass slide during macro imaging for tissue localization as described in detail with reference to FIG. 6. In some cases, most times contaminant may not be detected inside imaging area on stage underneath the glass slide. In these cases, next slide in the sequence may be selected for scanning (at step 405). In case where one or more contaminants are detected in imaging area, such contaminants may potentially affect the subsequent imaging process, thus needs to be cleaned. First time around when contaminants are detected in imaging area at step 420, containment cleaning mechanism may be triggered to clear imaging area. Imaging area may be checked again for contaminant. If contaminant is detected again, imaging device may pause and request for user input from a human operator at step 425.

Figure 5:
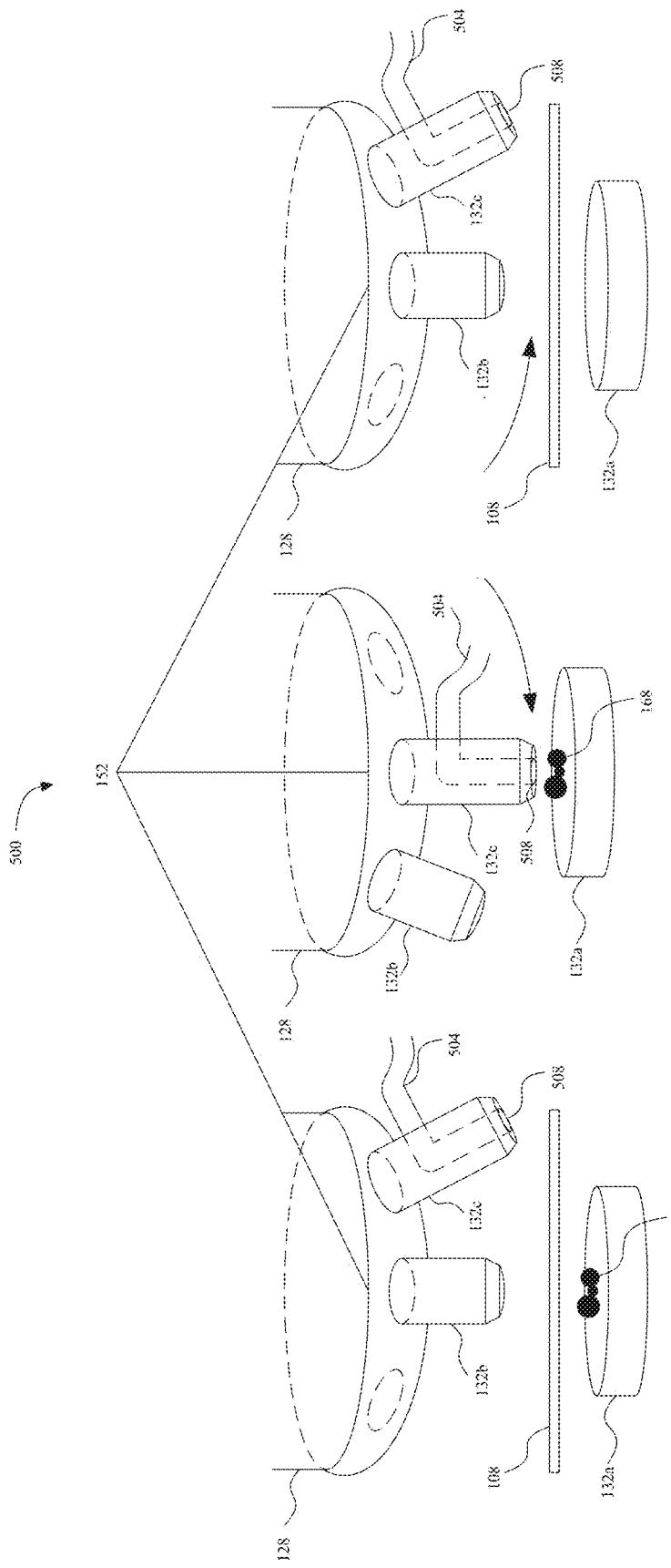
FIG. 5A illustrates a first exemplary embodiment of contaminants removal mechanism during whole slide imaging.
FIG. 5B illustrates another first exemplary embodiment of contaminants removal mechanism integrated into imaging device.
FIG. 5C illustrates another first exemplary embodiment of contaminants removal mechanism once cleaning is complete.

Now referring to FIGS. 5A-C, a first exemplary embodiment of contaminants removal mechanism 500 is illustrated. FIGS. 5A-C may describe an execution of contaminant cleaning protocol 176 as described above. In some cases, contaminant cleaning protocol 176 may include a series of events that take place when contaminant 168 is detected (indicated by positive contaminant presence indicator as described above with reference to FIG. 1). However, it should be noted that, FIGS. 5A-C may show only the case where containment 168 are located on the first optical component 132a e.g., condenser lens, contaminant removal mechanism as described herein may be versatile and can address contaminants situated on other system components in optical path 156 as well. In some embodiments, as described above, contaminant 168 may be found on other optical components such as objective lens 132b, stage 112 and/or slide port 116 (not shown), slide 108, light source 140 (not shown), and/or the like.

With reference to FIG. 5A, during whole slide imaging, system 100 may be configured to detect contaminant 168 e.g., undesired particles in optical path 156 on first optical component 132a e.g., condenser lens. In some cases, system 100 may include optical system 128 having at least one optical sensor configured to capture a slide image of slide 108. Computing device 150 within system 100 may be configured to determine contaminant presence indicator based on captured slide image as described above with reference to FIGS. 1-3. In some cases, contaminant presence indicator may be determined using one or more machine learning process as described herein, for example, and without limitation, computer vision model as described above with reference to FIG. 1.

Still referring to FIG. 5A, in some cases, contaminant removal mechanism 500 may be integrated into imaging device 104 within an objective turret mechanically attached to nosepiece 152 as described above such as a revolving nosepiece. In a non-limiting example, at least one optical component of plurality of optical components 132a-d. In some cases, plurality of optical components 132a-d may each housed in an objective turret. At least one of the objective turret 508, as shown throughout FIGS. 5A-C, may be configured to house at least one vacuum suction enabled component 504 as described herein. In other cases, system 100 may include an integrated contaminant removal mechanism 500, wherein contaminant removal mechanism 500 may be integrated into at least one optical component of plurality of optical components 132a-d, e.g., a third optical component 132c. In such cases, contaminant removal mechanism, when fitted into objective turret, may be designed as a compact module, wherein the compact module may include miniature brushes, wipers, vacuum suction enabled component 504, and/or the like as described above. In some cases, contaminant removal mechanism may be configured to not interfere with rotation of the turret or alignment of optical components e.g., objective lenses. In some cases, vacuum suction enabled component 504 may be located at the underside of the turret, proximate to slide 108 or condenser lens surface that may require cleaning. At least an inlet 512 of vacuum suction enabled component 504 pointing downward, may be configured to facilitates suction process of detected contaminant 168 when turret rotates to align removal mechanism 500 directly above the contamination area 172 as described below with reference to FIG. 5B.

With reference to FIG. 5B, in operation, when a positive contaminant presence indicator is determined, slide 108 may be removed, stage 112 may be moved, and turret may be rotated to position contaminant removal mechanism 500 directly above slide 108 or contamination area 172 based on contaminant cleaning protocol 176. Actuator mechanism 120 may be used to remove slide 108 from stage 112 and/or slide port 116, and further move stage 112 in X, Y, Z direction, or combination thereof for contaminant removal mechanism 500 to access affected areas. At least an inlet 512 of vacuum suction enabled component 504 may engage and clean target area. In a non-limiting example, vacuum suction enabled component 504 may include a miniature vacuum configured to remove detected contaminant 168.

With reference to FIG. 5C, once cleaning process is complete, turret may rotate back to position the second optical component 132b e.g., objective lens for continued observation. In some cases, after the vacuum process, slide 108 may be placed back inside imaging device 104, using actuator mechanism 120.

With reference to FIGS. 6A-D, a second exemplary embodiment of contaminant removal mechanism 600 is illustrated. FIGS. 6A-D also shows the impact of cleaning imaging area 604, also know as "slot" on stage, below slide 108 during macro imaging for tissue localization. Contaminant 168 in imaging area 604 may distort macro image captured by macro camera, leading to inaccurate tissue localization, and potentially compromising the integrity of subsequent slide image analysis.

With reference to FIG. 6A, slide 108 containing specimen 608 may be imaged by a macro camera 612 with contaminant 168 below it in imaging area 604 e.g., a XY stage slot. In some cases, specimen 608 may include, without limitation, tissue samples, cellular structures, or other biological materials. As a person skilled in the art, upon reviewing the entirety of this disclosure, will recognize the importance of maintaining a clear imaging area for accurate tissue localization. In a non-limiting example, if contaminant 168 is not removed, in some cases, it may masquerade as tissue and WSI of slide 108 may be wrong.

With reference to FIG. 6B, during determination of contaminant presence indicator, a macro image of (empty) slot 604, without slide 108 in imaging device 104, may be captured by macro camera 612. In some cases, this macro image may serve as a reference to detect discrepancies caused by contaminant 168.

With reference to FIG. 6C, contaminant 168 may be detected, contaminant removal mechanism 600 having vacuum suction enabled component 616 may be triggered, and contaminant cleaning protocol may be executed. In some cases, vacuum suction enabled component 616 may include a removal adapter 620 as described above with reference to FIG. 1, wherein the removal adapter is configured to efficiently cover and clean the entire imaging area 604. In a non-limiting example, execution of contaminant cleaning protocol may involve a combination or suction and mechanical action as described herein. Additionally, or alternatively, contaminant 168 may be cleared out using vacuum suction by maneuvering removal adapter 620 over slot 604 while contaminant removal mechanism is activated, and vacuum is enabled.

With reference to FIG. 6D, a macro image of slide 108 after execution of contaminant cleaning protocol 176 is illustrated. Tissue mask is now correct and whole slide imaging may be proceeded.

Figure 7:
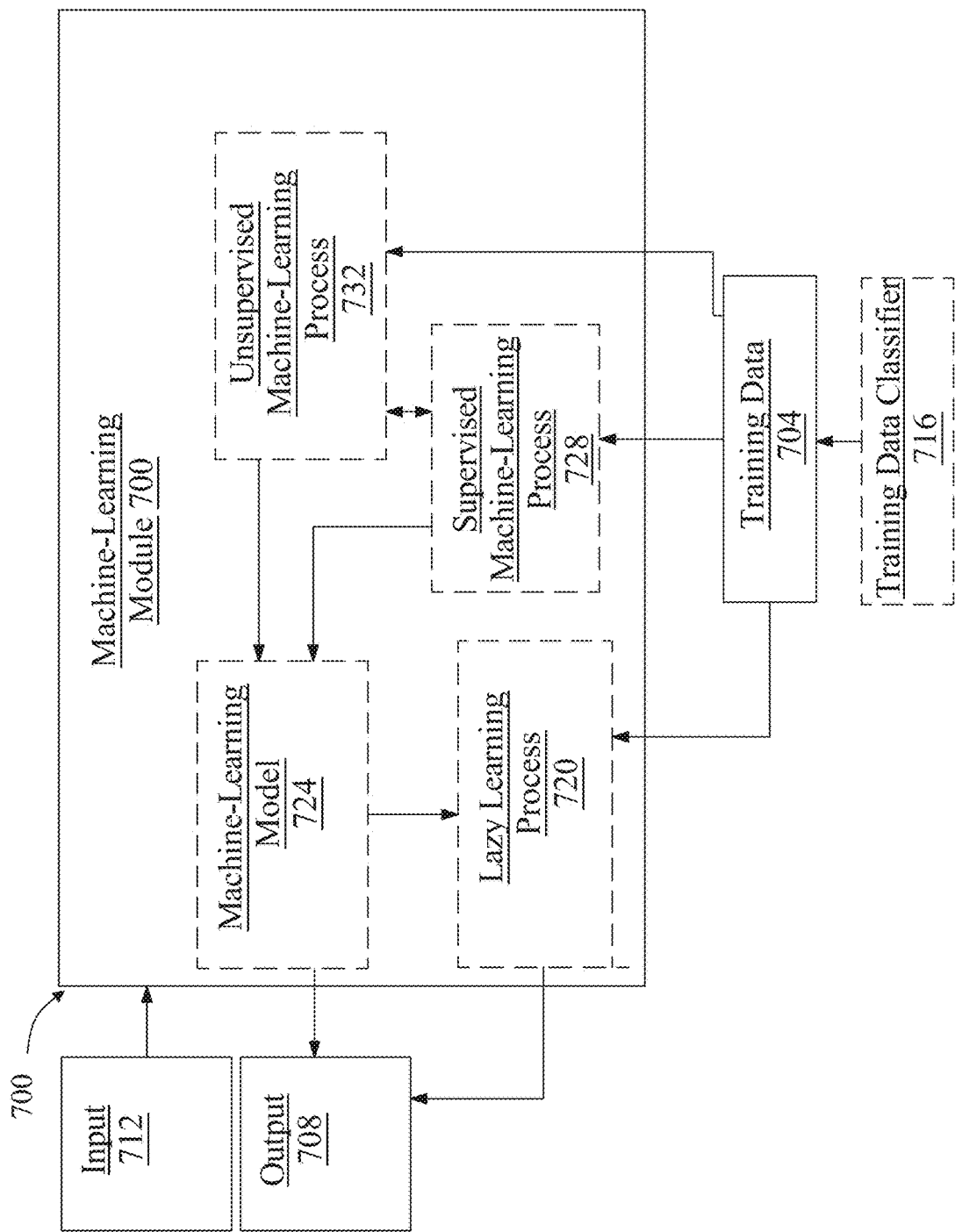
FIG. 7 is a block diagram of an exemplary embodiment of a machine learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm instantiated in hardware or software logic, data structures, and/or functions that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example, training data may include a plurality of slide images as input, correlated to a plurality of contaminants presence indicators as output.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of contaminant presence training data as described above to identify specific patterns or characteristics commonly found in a particular cohort of samples. This could be based on factors such as the source of the sample, environmental conditions during sample collection, or specific biological markers. Such classification can help in tailoring the contaminant detection algorithms for specific sub-populations, ensuring higher accuracy and relevance. For instance, samples collected from a marine environment might have a different set of contaminants compared to those from an urban setting.

Still referring to FIG. 7, computing device 704 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 704 may then calculate a likelihood table by calculating probabilities of different data entries and classification labels. Computing device 704 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 7, computing device 704 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 7, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 7, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 7, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 7, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 7, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 7, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 7, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Antialiasing and/or anti-imaging filters, and/or low-pass filters, may be used to cleanup side-effects of compression.

Further referring to FIG. 7, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 7, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 7, machine-learning processes as described in this disclosure may be used to generate machine-learning models 724. A "machine-learning model," as used in this disclosure, is a data structure representing and/or instantiating a mathematical and/or algorithmic representation of a relationship between inputs and outputs, as generated using any machine-learning process including without limitation any process as described above and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include plurality of slide images as described above as inputs, a plurality of contaminant presence indicators as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

With further reference to FIG. 7, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms.

Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 7, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 732 may not require a response variable; unsupervised processes 732 may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 7, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 7, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 7, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 7, one or more processes or algorithms described above may be performed by at least a dedicated hardware unit 736. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 736 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 736 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 736 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 8:
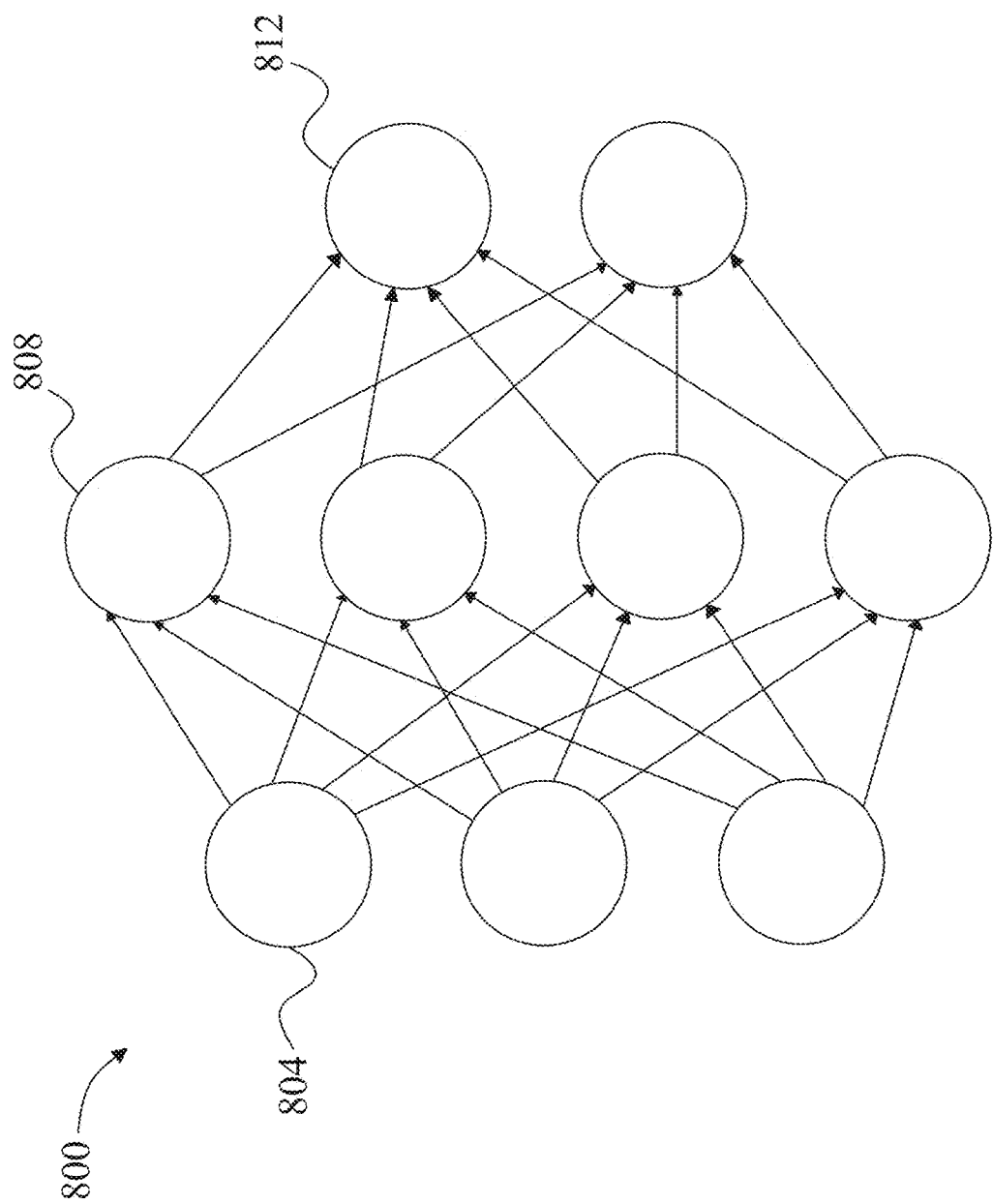
FIG. 8 is a diagram of an exemplary embodiment of a neural network.

Referring now to FIG. 8, an exemplary embodiment of neural network 800 is illustrated. A neural network 800 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 804, one or more intermediate layers 808, and an output layer of nodes 812. In a non-limiting embodiment, input layer of nodes 804 may include any remote display where user inputs may be provided from, while output layer of nodes 812 may include either the local device if it has the processing capability to support the requisite machine-learning processes, or output layer of nodes 812 may refer to a centralized, network connected processor able to remotely conduct the machine-learning processes described herein. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

With continued reference to FIG. 8, in an embodiment, neural network 800 may include a deep neural network (DNN). As used in this disclosure, a "deep neural network" is defined as a neural network with two or more hidden layers. In a non-limiting example, DNN may include a convolutional neural network (CNN). Determining contaminant presence indicator may include training CNN using contaminant presence training data as described above and determining contaminant presence indicator using trained CNN. A "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data e.g., slide images through a sliding window approach. In some cases, convolution operations may enable computing device to detect local/global patterns, edges, textures, and any other features described herein within slide images. Features may be passed through one or more activation functions, such as without limitation, Rectified Linear Unit (ReLU), to introduce non-linearities into determination of contaminant presence indicator. Additionally, or alternatively, CNN may also include one or more pooling layers, wherein each pooling layer is configured to reduce the dimensionality of input data while preserving essential features within the input data. In a non-limiting example, CNN may include one or more pooling layer configured to reduce the dimensions of feature maps by applying downsampling, such as max-pooling or average pooling, to small, non-overlapping regions of one or more features.

Still referring to FIG. 8, CNN may further include one or more fully connected layers configured to combine features extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output such as, without limitation, contaminant presence indicator. Further, each fully connected layer may be followed by one or more dropout layers configured to prevent overfitting, and one or more normalization layers to stabilize the learning process described herein.

With continued reference to FIG. 8, CNN may further include a 3D CNN, wherein the 3D CNN, unlike standard 2D CNN, may include utilization of one or more 3D convolutions which allow them to directly process 3D data, thereby enabling computing device to generate 3D structures such as 3D plane model and/or determining planarity values of generated 3D plane model using the 3D CNN. In a non-limiting example, 3D CNN may include one or more 3D filters (i.e., kernels) that move through 3D plane model in three dimensions and capturing spatial relationships in x, y, and z axis. Similar to 3D convolutions, 3D CNN may further include one or more 3D pooling layers that may be used to reduce the dimensionality of 3D plane models of slide images while preserving spatial features as described above. Additionally, or alternatively, an encoder-decoder structure may be implemented (extended to 3D) in 3D CNN, wherein the encoder-decoder structure includes an encoding path that captures the context and a decoding path that enables precise localization in a same manner as U-net as described above. Such encoder-decoder structures may also include a plurality of skip connections, allowing 3D CNN to use information from multiple resolutions to improve the process of determining contaminant presence indicator.

With continued reference to FIG. 8, in an embodiment, training the CNN may include selecting a suitable loss function to guide the training process. In a non-limiting example, a loss function that measures the difference between the predicted contaminant presence indicator and the ground truth may be used, such as, without limitation, mean squared error (MSE) or a custom loss function may be designed for one or more embodiments described herein. Additionally, or alternatively, optimization algorithms, such as stochastic gradient descent (SGD), may then be used to adjust the CNN parameters to minimize such loss. In a further non-limiting embodiment, instead of directly predicting contaminant presence indicator, computer vison model including CNN may be trained as a regression model to predict numeric values e.g., planarity values associated with slides. Additionally, CNN may be extended with additional deep learning techniques, such as recurrent neural networks (RNNs) or attention mechanism, to capture additional features and/or data relationships within input data.

Figure 9:
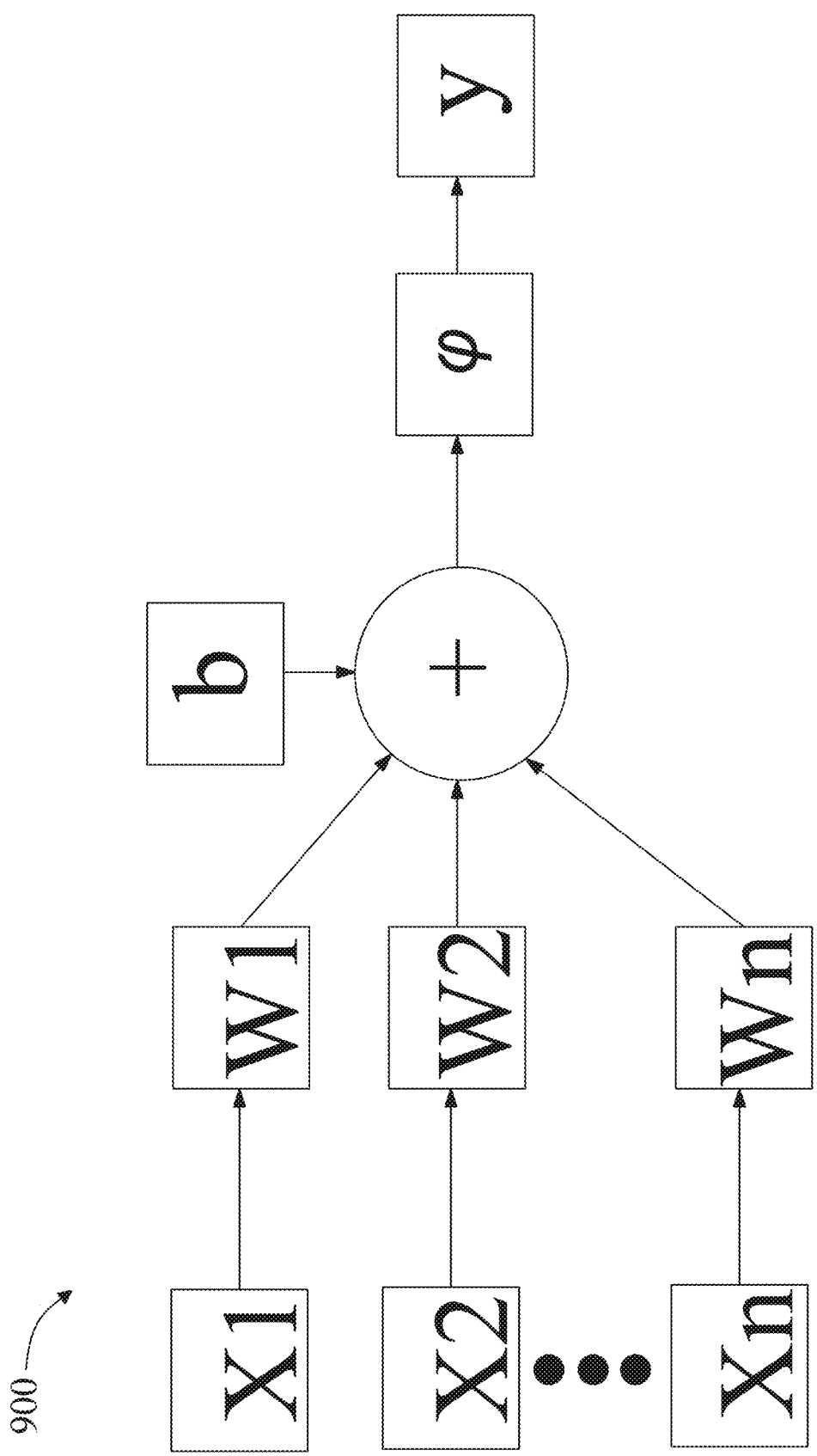
FIG. 9 is a block diagram of an exemplary embodiment of a node of a neural network.

Referring now to FIG. 9, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x 6 e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\Sigma_i x_i}$$

where the inputs to an instant layer are $x_i$, a swish function such as $f(x) = x*\text{sigmoid}(x)$, a Gaussian error linear unit function such as $$f(x) = a\left(16 \tanh\left(\sqrt{2/\pi}\,(x 6 b x^r)\right)\right)$$

for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 10:
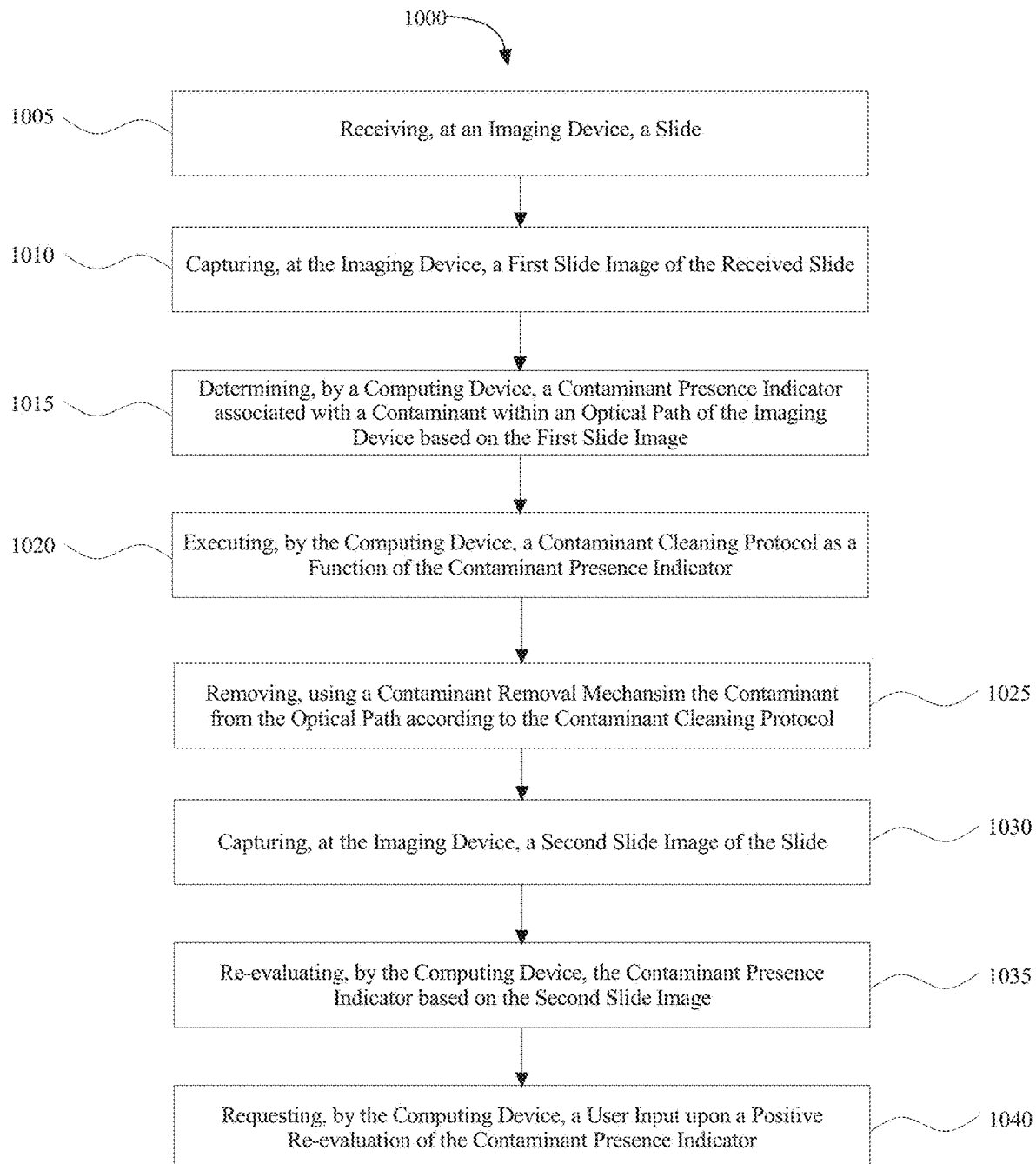
FIG. 10 is a flow diagram illustrating an exemplary embodiment of a method for detecting and cleaning contaminants from an imaging optical path.

Now referring to FIG. 10, a flow diagram of an exemplary method 1000 for detecting and cleaning contaminants from an imaging optical path is illustrated. Method 1000 includes a step 1005 of receiving, at an imaging device, a slide. In some embodiments, the imaging device may include at least a stage configured to hold the slide containing a specimen, at least two optical components, wherein the at least two optical components may include a first optical component connected to a light source, wherein the first optical component is configured to direct light illuminated from the light source, and a second optical component configured to focus the light onto the specimen, wherein the optical path is defined between the first optical component and the second optical component. In some embodiments, Imaging device may further include at least an optical sensor disposed adjacent to the second optical component of the at least two optical components, wherein the at least an optical sensor is configured to capture first an image of the specimen. This may be implemented, without limitation, as described above with reference to FIGS. 1-9.

With continued reference to FIG. 10, method 1000 includes a step of 1005 of capturing, at the imaging device, a first slide image of the received slide. This may be implemented without limitation, as described above with reference to FIGS. 1-9.

With continued reference to FIG. 10, method 1000 includes a step of 1010 of determining, by a computing device communicatively connected to the imaging device, a contaminant presence indicator associated with a contaminant within an optical path of the imaging device based on the first slide image. In some embodiments, contaminant presence indicator may include a first indicator associated with the contaminant located on the first optical component within the optical path. In some embodiments, the contaminant presence indicator may include a second indicator associated with the contaminant located on a slide setting area of the stage. In other embodiments, the contaminant presence indicator may include a third indicator associated with the contaminant located below the slide. In some cases, determining the contaminant presence indicator may include training a computer vision model using contaminant presence training data, wherein the contaminant presence training data may include a plurality of slide images as input correlated to a plurality of contaminant presence indicators as output, and determining the contaminant presence indicator as a function of the first slide image using the trained computer vision model. This may be implemented without limitation, as described above with reference to FIGS. 1-9.

With continued reference to FIG. 10, method 1000 includes a step of 1015 of executing, by the computing device, a contaminant cleaning protocol as a function of the contaminant presence indicator. This may be implemented without limitation, as described above with reference to FIGS. 1-9.

With continued reference to FIG. 10, method 1000 includes a step of 1020 of removing, using a contaminant removal mechanism operatively connected to the imaging device, the contaminant from the optical path according to the contaminant cleaning protocol. In some embodiments, contaminant removal mechanism may include at least one vacuum suction enabled component having at least an inlet. In some embodiments, the contaminant removal mechanism may further include a removal adapter attached to the at least an inlet of the at least one vacuum suction enabled component, wherein the removal adapter is configured to extend a reach of the at least one vacuum suction enabled component. This may be implemented without limitation, as described above with reference to FIGS. 1-9.

With continued reference to FIG. 10, method 1000 includes a step of 1025 of capturing, at the imaging device, a second slide image of the slide. This may be implemented without limitation, as described above with reference to FIGS. 1-9.

With continued reference to FIG. 10, method 1000 includes a step of 1030 of re-evaluating, by the computing device, the contaminant presence indicator based on the second slide image. This may be implemented without limitation, as described above with reference to FIGS. 1-9.

With continued reference to FIG. 10, method 1000 includes a step of 1035 of requesting, by the computing device, a user input upon a positive re-evaluation of the contaminant presence indicator. In some embodiments, requesting the user input may include displaying an alert to a user through a user interface at a display device requesting the user to clean the contaminant. This may be implemented without limitation, as described above with reference to FIGS. 1-9.

With continued reference to FIG. 10, method 1000 may further include a step of moving, using an actuator mechanism mechanically connected to a mobile element, the stage attached to the mobile element to a desired location determined based on the contaminant cleaning protocol, thereby enabling the contaminant removal mechanism to remove the contaminant from the optical path. This may be implemented without limitation, as described above with reference to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
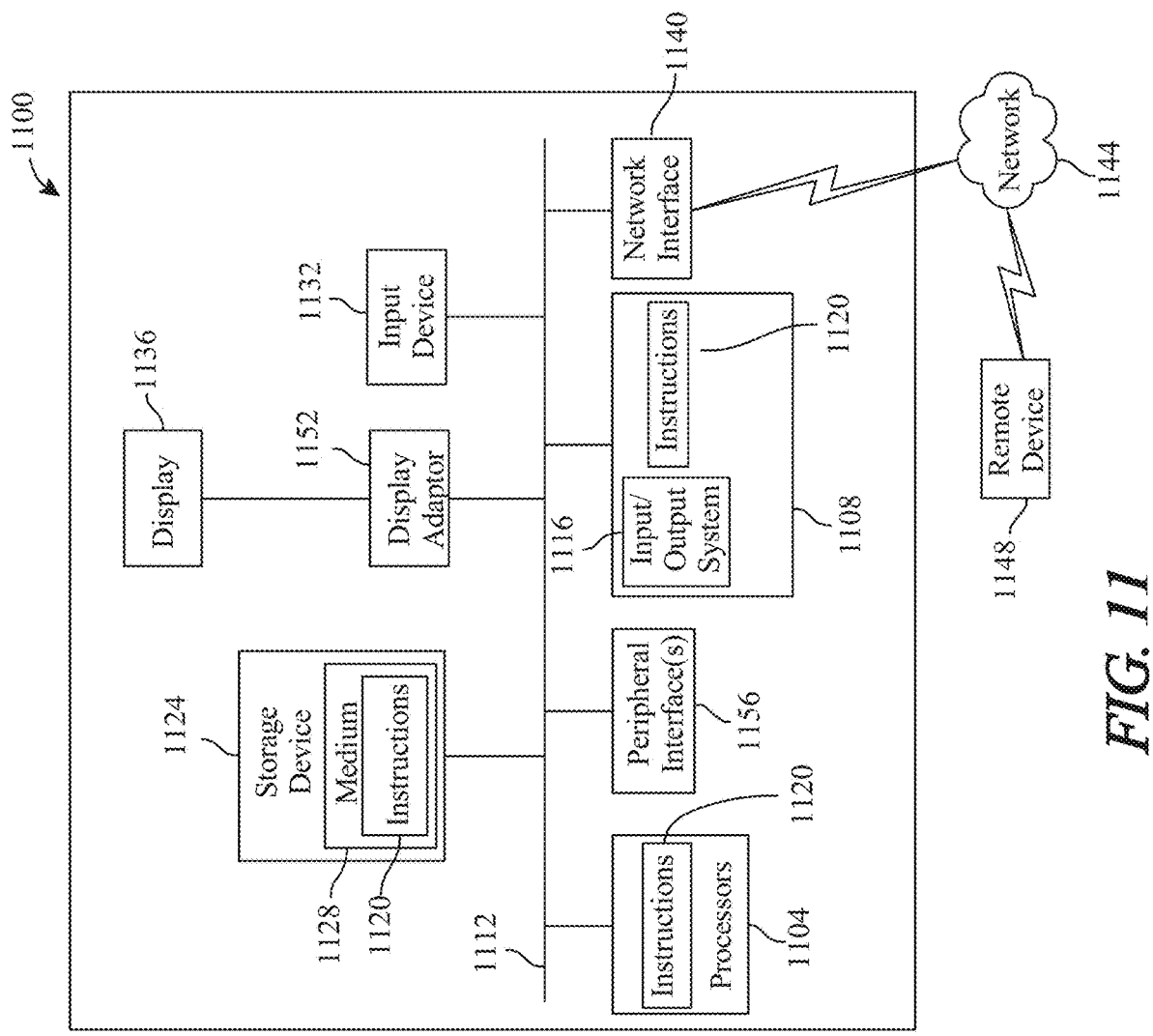
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for detecting and cleaning contaminants from an imaging optical path, wherein the system comprises:
    an imaging device, wherein the imaging device is configured to:
        receive a slide; and
        capture a first slide image of the received slide;
    at least a computing device communicatively connected to the imaging device, wherein the computing device is configured to:
        determine a contaminant presence indicator associated with a contaminant within an optical path of the imaging device based on the first slide image; and
        execute a contaminant cleaning protocol as a function of the contaminant presence indicator;
        re-evaluate the contaminant presence indicator based on a second slide image of the slide captured using the imaging device; and
        request a user input upon a positive re-evaluation of the contaminant presence indicator; and
    a contaminant removal mechanism operatively connected to the imaging device, wherein the contaminant removal mechanism is configured to:
        remove the contaminant from the optical path according to the contaminant cleaning protocol.

2. The system of claim 1, wherein the imaging device comprises:
    at least a stage configured to hold the slide, wherein the slide comprises a specimen;
    at least two optical components, wherein the at least two optical components comprise:
        a first optical component connected to a light source, wherein the first optical component is configured to direct light illuminated from the light source; and
        a second optical component configured to focus the light onto the specimen, wherein the optical path is defined between the first optical component and the second optical component; and
    at least an optical sensor disposed adjacent to the second optical component of the at least two optical components, wherein the at least an optical sensor is configured to capture first an image of the specimen.

3. The system of claim 2, further comprises:
    an actuator mechanism mechanically connected to a mobile element, wherein the stage is attached to the mobile element; and
    a stage controller communicatively connected to the at least a computing device, wherein the stage controller is configured to:
        move the stage to a desired location determined based on the contaminant cleaning protocol using the actuator mechanism, thereby enabling the contaminant removal mechanism to remove the contaminant from the optical path.

4. The system of claim 3, wherein the contaminant presence indicator comprises:
    a second indicator associated with the contaminant located on a slide setting area of the stage.

5. The system of claim 2, wherein the contaminant presence indicator comprises:
    a first indicator associated with the contaminant located on the first optical component within the optical path.

6. The system of claim 1, wherein the contaminant presence indicator comprises a third indicator associated with the contaminant located below the slide.

7. The system of claim 1, wherein determining the contaminant presence indicator comprises:
    training a computer vision model using contaminant presence training data, wherein the contaminant presence training data comprises a plurality of slide images as input correlated to a plurality of contaminant presence indicators as output; and
    determining the contaminant presence indicator as a function of the first slide image using the trained computer vision model.

8. The system of claim 1, wherein the contaminant removal mechanism comprises at least one vacuum suction enabled component having at least an inlet.

9. The system of claim 8, wherein the contaminant removal mechanism further comprises:
    a removal adapter attached to the at least an inlet of the at least one vacuum suction enabled component, wherein the removal adapter is configured to extend a reach of the at least one vacuum suction enabled component.

10. The system of claim 1, wherein requesting the user input comprises:
    displaying an alert to a user through a user interface at a display device requesting the user to clean the contaminant.

11. A method for detecting and cleaning contaminants from an imaging optical path, wherein the method comprises:
    receiving, at an imaging device, a slide;
    capturing, at the imaging device, a first slide image of the received slide;
    determining, by a computing device communicatively connected to the imaging device, a contaminant presence indicator associated with a contaminant within an optical path of the imaging device based on the first slide image;

executing, by the computing device, a contaminant cleaning protocol as a function of the contaminant presence indicator;

removing, using a contaminant removal mechanism operatively connected to the imaging device, the contaminant from the optical path according to the contaminant cleaning protocol;

capturing, at the imaging device, a second slide image of the slide;

re-evaluating, by the computing device, the contaminant presence indicator based on the second slide image; and requesting, by the computing device, a user input upon a positive re-evaluation of the contaminant presence indicator.

12. The method of claim 11, wherein the imaging device comprises:
at least a stage configured to hold the slide, wherein the slide comprises a specimen;
at least two optical components, wherein the at least two optical components comprise:
a first optical component connected to a light source, wherein the first optical component is configured to direct light illuminated from the light source; and
a second optical component configured to focus the light onto the specimen, wherein the optical path is defined between the first optical component and the second optical component; and
at least an optical sensor disposed adjacent to the second optical component of the at least two optical components, wherein the at least an optical sensor is configured to capture first an image of the specimen.

13. The method of claim 12, further comprises:
moving, using an actuator mechanism mechanically connected to a mobile element, the stage attached to the mobile element to a desired location determined based on the contaminant cleaning protocol, thereby enabling the contaminant removal mechanism to remove the contaminant from the optical path.

14. The method of claim 13, wherein the contaminant presence indicator comprises:
a second indicator associated with the contaminant located on a slide setting area of the stage.

15. The method of claim 12, wherein the contaminant presence indicator comprises:
a first indicator associated with the contaminant located on the first optical component within the optical path.

16. The method of claim 11, wherein the contaminant presence indicator comprises a third indicator associated with the contaminant located below the slide.

17. The method of claim 11, wherein determining the contaminant presence indicator comprises:
training a computer vision model using contaminant presence training data, wherein the contaminant presence training data comprises a plurality of slide images as input correlated to a plurality of contaminant presence indicators as output; and
determining the contaminant presence indicator as a function of the first slide image using the trained computer vision model.

18. The method of claim 11, wherein the contaminant removal mechanism comprises at least one vacuum suction enabled component having at least an inlet.

19. The method of claim 18, wherein the contaminant removal mechanism further comprises:
a removal adapter attached to the at least an inlet of the at least one vacuum suction enabled component, wherein the removal adapter is configured to extend a reach of the at least one vacuum suction enabled component.

20. The method of claim 11, wherein requesting the user input comprises: displaying an alert to a user through a user interface at a display device requesting the user to clean the contaminant.

\* \* \* \* \*